United States Patent
Yokoyama

(10) Patent No.: US 7,426,079 B2
(45) Date of Patent: Sep. 16, 2008

(54) OPTICAL SYSTEM

(75) Inventor: Takayoshi Yokoyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/404,283

(22) Filed: Apr. 13, 2006

(65) Prior Publication Data

US 2007/0014025 A1     Jan. 18, 2007

(30) Foreign Application Priority Data

Apr. 22, 2005   (JP)   .............. 2005-125149

(51) Int. Cl.
*G02B 3/00* (2006.01)
*G02B 7/00* (2006.01)
*G02B 9/00* (2006.01)
*G02B 11/00* (2006.01)
*G02B 13/00* (2006.01)
*G02B 15/00* (2006.01)
*G02B 17/00* (2006.01)
*G02B 25/00* (2006.01)

(52) U.S. Cl. .............. 359/642; 359/649; 359/652; 359/653; 359/654

(58) Field of Classification Search .......... 359/642, 359/649, 652, 653, 654
See application file for complete search history.

(56) References Cited

U.S. PATENT DOCUMENTS

| 4,515,446 A * | 5/1985 | Takahashi et al. ........ 359/686 |
| 5,638,215 A | 6/1997 | Neil |
| 5,731,907 A | 3/1998 | Sigler |
| 6,317,268 B1 * | 11/2001 | Harrigan .............. 359/649 |
| 6,496,310 B2 | 12/2002 | Fujimoto |
| 7,057,831 B2 * | 6/2006 | Ogawa .............. 359/795 |
| 2002/0122264 A1 * | 9/2002 | Ogawa .............. 359/795 |

FOREIGN PATENT DOCUMENTS

| JP | 6-82689 A | 3/1994 |
| JP | 2000-147373 A | 5/2000 |
| JP | 2002-156582 | 5/2002 |
| JP | 2002-287031 A | 10/2002 |

* cited by examiner

*Primary Examiner*—Scott J. Sugarman
*Assistant Examiner*—Brandi N Thomas
(74) *Attorney, Agent, or Firm*—Canon U.S.A., Inc. I.P. Division

(57) ABSTRACT

At least one exemplary embodiment is directed to A retro focus optical system that is capable of sufficiently correcting and/or reducing various aberrations including the chromatic aberration. The optical system includes a refractive optical element including a solid material. The Abbe number vd and the partial dispersion ratio θgF of the solid material along with a shape of the refractive optical element can reduce various aberrations.

12 Claims, 15 Drawing Sheets

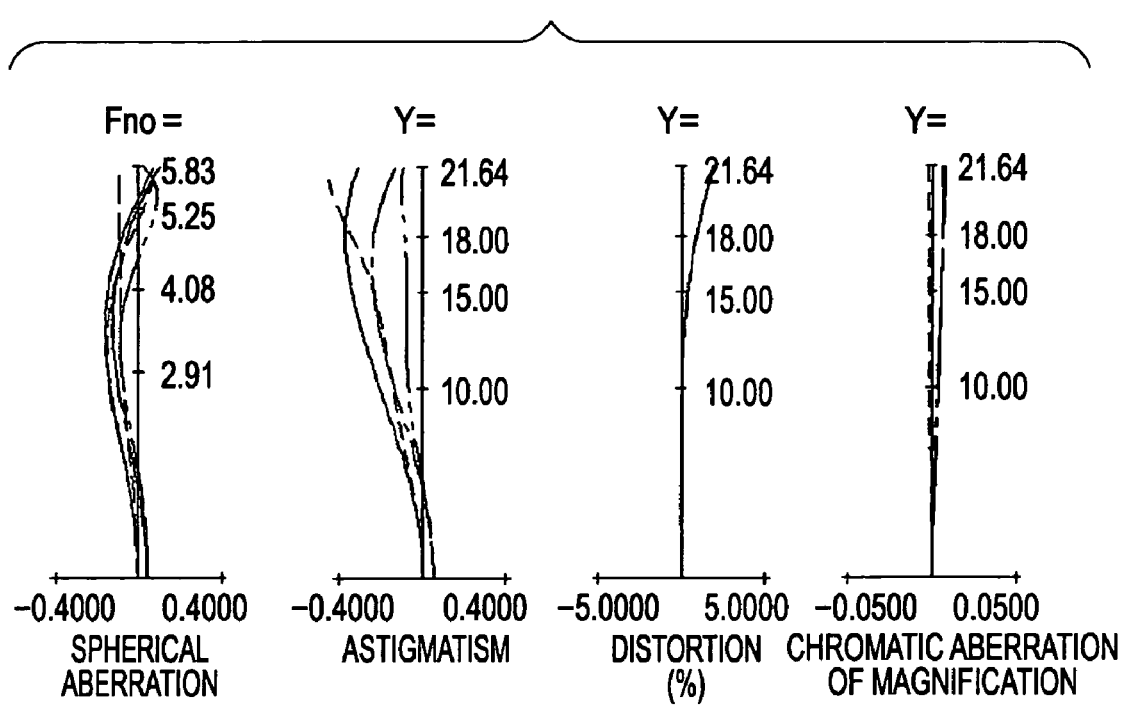

OPTICAL SYSTEM

BACKGROUND OF THE INVENTION

1. Field of the Invention

The present invention relates to an optical system and, in particular though not exclusively, to an optical system that can be used for photographing optical systems, observation optical systems, projection optical systems, and readout optical systems.

2. Description of the Related Art

Retro focus lens systems (negative lead type) have been widely used to provide a wide angle (wide viewing angle) to lens systems. Such a retro focus lens system includes a lens component with negative refractive power disposed in the front and a lens component with positive refractive power disposed in the rear, thereby providing a short focal length and a long back focus. As used herein, the term "front" refers to a side adjacent to a subject in photographing optical systems (e.g., cameras) and a side adjacent to a screen in projection optical systems (e.g., projectors). The term "rear" refers to a side adjacent to an image plane in the photographing optical system and a side adjacent to an original image in the projection optical system. In correcting and/or reducing aberration of a lens, the retro focus lenses have a disadvantage in that negative distortion (barrel distortion) tends to occur, since a lens component with negative refractive power is disposed in the front and the refractive power is not symmetrical. By forming a negative lens in the lens component with negative refractive power from a material of a high index of refraction, the negative distortion can be reduced. However, in general, since materials of a high index of refraction are of high dispersion, negative chromatic aberration of magnification (transverse chromatic aberration) tends to occur.

To correct and/or reduce the negative chromatic aberration of magnification in a retro focus lens, a method is known in which a positive lens formed from a low dispersion material of extraordinary partial dispersion (e.g., fluorite) can be used in a lens component disposed at the rear of an aperture stop and having an equivalently large height (distance from an optical axis) H of entering paraxial chief ray on the lens surface. In many conventional retro focus optical systems, the chromatic aberration is reduced using this method. A variety of retro focus optical systems using this method has been discussed (refer to, for example, Japanese Patent Laid-Open No. 06-082689 and Japanese Patent Laid-Open No. 2002-287031).

Additionally, a method for correcting and/or reducing chromatic aberration using a diffractive optical element without using a material of extraordinary partial dispersion is discussed in, for example, Japanese Patent Laid-Open No. 2000-147373 and Japanese Patent Laid-Open No. 2002-156582 (corresponding to U.S. Pat. No. 6,496,310). In these patent documents, a retro focus optical systems having equivalently well corrected chromatic aberration are proposed by appropriately combining a diffractive optical element with a refractive optical element.

Among optical materials having a chromatic aberration correcting and/or reducing function related to the optical characteristic of a diffractive optical element, a liquid material, which can have a characteristic of equivalently high dispersion and extraordinary partial dispersion, is known. Achromatic optical systems using that material are discussed in, for example, U.S. Pat. Nos. 5,731,907 and 5,638,215.

In general, a long total length of an optical system (total length of lenses) can correct the chromatic aberration equivalently well. If the total optical length is reduced, a large amount of chromatic aberration appears.

This is because the method for correcting and/or reducing chromatic aberration employs low dispersion and extraordinary partial dispersion that a material such as fluorite possesses to reduce chromatic aberration generated by the front element itself. When correcting and/or reducing chromatic aberration generated when the length of a lens is reduced, for example, in an optical system that employs a low-dispersion material, which can have a large Abbe number (e.g., fluorite), the chromatic aberration does not change unless the power on the lens surface is largely changed. Accordingly, it can be difficult to correct and/or reduce the chromatic aberration and other types of aberration (e.g., spherical aberration, coma aberration, and astigmatism) contemporaneously.

In contrast, a diffractive optical element has a sufficient correcting function of chromatic aberration. However, optical systems including a diffractive optical element can degrade a focusing performance since unwanted diffracting light having diffracting orders other than the designed diffracting order becomes color flair light. Some optical systems including a diffractive optical element concentrate energy on the designed diffracting order by using a so-called layered diffractive optical element so as to largely reduce unwanted diffracting light. However, when photographing a subject having high brightness, the diffraction flair might still appear.

Materials described in U.S. Pat. Nos. 5,731,907 and 5,638,215 are liquid. Therefore, the characteristic of the index of refraction and the characteristic of dispersion are largely changed in accordance with the change in temperature. Thus, the resistance to the surrounding environment is not sufficient.

SUMMARY OF THE INVENTION

At least one exemplary embodiment is directed to an optical system that can be used in a photographing optical systems (e.g., silver salt film cameras, digital still cameras, video cameras, and other image capture apparatus as known by one of ordinary skill in the relevant arts and equivalents), observation optical systems (e.g., telescopes, binoculars, and other observation optical systems and sensors as known by one of ordinary skill in the relevant arts and equivalents), projection optical systems (e.g., a projector, and other image projection optical systems as known by one of ordinary skill in the relevant arts and equivalents), and readout optical systems (e.g., a copier, a fax, and other readout optical systems as known by one of ordinary skill in the relevant arts and equivalents).

At least one exemplary embodiment is directed to an optical system for facilitating correction and/or reduction of various types of aberration, such as chromatic aberration.

According to an exemplary embodiment of the present invention, a retro focus optical system includes at least one refractive optical element composed of a solid material. The Abbe number $\nu d$ and the partial dispersion ratio $\theta gF$ of the solid material can satisfy the following conditions:

$$-2.100 \times 10^{-3} \cdot \nu d + 0.693 < \theta gF, \text{ and}$$

$$0.555 < \theta gF < 0.9.$$

When the refractive optical element is disposed at the front of a pupil, the refractive optical element has a shape so that a negative refractive power increases towards the periphery from the optical axis. When the refractive optical element is disposed at the rear of a pupil, the refractive optical element has a shape so that a positive refractive power increases towards the periphery from the optical axis.

According to another exemplary embodiment of the present invention, a retro focus optical system includes at least one refractive optical element composed of solid material. The Abbe number νd and the partial dispersion ratio θgF of the solid material satisfy the above-described two conditions. When the refractive optical element is disposed at the front of a pupil, the refractive optical element has a shape so that the thickness of the refractive optical element at a position of about 70% of the maximum effective ray diameter is greater than a thickness of the refractive optical element on the optical axis. When the refractive optical element is disposed at the rear of a pupil, the refractive optical element has a shape so that the thickness of the refractive optical element at a position of about 70% of the maximum effective ray diameter is less than a thickness of the refractive optical element on the optical axis.

In at least one exemplary embodiment, the definitions of the Abbe number νd and the partial dispersion ratio θgF and θgd are identical to those generally used.

In at least one exemplary embodiment, when Ng, Nd, NF, and NC respectively represent the indices of refraction of the material for g-line, d-line, F-line, and C-line of Fraunhofer lines, the definitions of the Abbe number νd and the partial dispersion ratios θgd and θgF are expressed as:

$$\nu d=(Nd-1)/(NF-NC)$$

$$\theta gF=(Ng-NF)/(NF-NC), \text{ and}$$

$$\theta gd=(Ng-Nd)/(NF-NC).$$

As used herein, the term "retro focus optical system" refers to an optical system in which a height of a paraxial marginal ray passing through the forefront lens surface of the optical system is less than, as measured from an optical axis, a maximum height of a paraxial marginal ray passing through a lens surface positioned at the rear of an intersection point of the optical axis with a paraxial chief ray, and which can satisfy the following conditions:

$$2<OTL/f<15$$

where OTL is the total optical length of the optical system and f is the focal length of the optical system. When the optical system is a zoom lens, OTL and f are values at a wide-angle end.

The position of a pupil corresponds to at least one of the position of an aperture stop and the intersection point of the optical axis with a paraxial chief ray.

Additionally, the term "solid material" refers to a material that is solid when the optical system is used. Before the optical system is used, for example, during a manufacturing time, the material can be in any state. For example, a material that is liquid during a manufacturing time and subsequently is solidified into a solid material also belongs to a category of a solid material of the exemplary embodiments of the present invention.

Further features of the present invention will become apparent from the following description of exemplary embodiments with reference to the attached drawings.

BRIEF DESCRIPTION OF THE DRAWINGS

FIGS. 13A-C are aberration graphs of the optical system according to exemplary embodiment 6 when focusing on an object at infinity.

DESCRIPTION OF THE EMBODIMENTS

Figure 1:
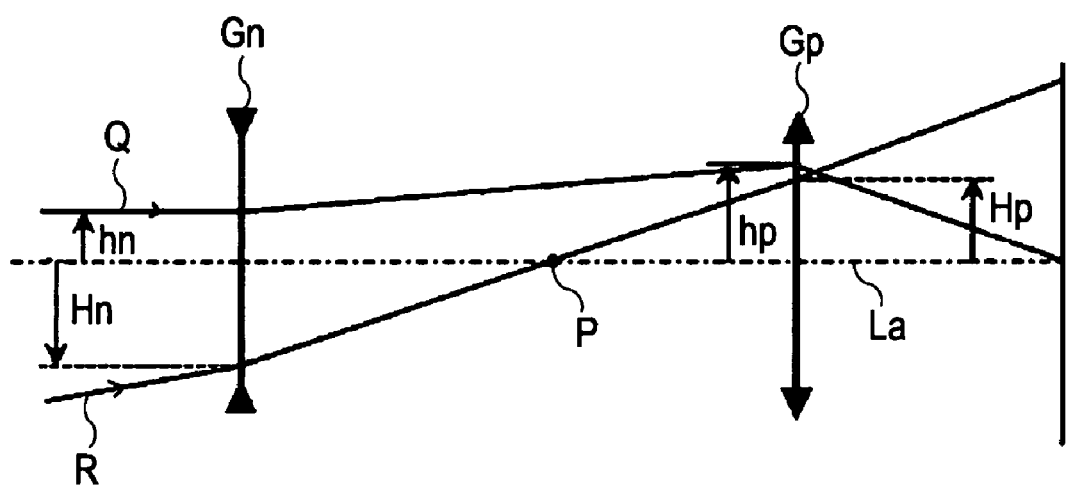
FIG. 1 is a schematic diagram of a paraxial refractive power layout for illustrating the operation of an optical system according to an exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

An optical system according to embodiments of the present invention is now herein described.

At least one exemplary embodiment is applicable to an optical system that can be used for photographing systems (e.g., digital cameras, video cameras, and silver salt film cameras), observation systems (e.g., telescopes and binoculars), and optical systems (e.g., a copier and a projector).

According to exemplary embodiments of the present invention, an optical system of a retro focus type includes a refractive optical element having an optical power (i.e., refractive power: the inverse of focal length). The refractive optical element is formed from a solid material, which can have a large (high) partial dispersion ratio.

As used herein, the term "refractive optical element" refers to, for example, a refractive lens or a layer on a lens that generates power by refraction. A diffractive optical element that generates a power by diffraction is not included in the examples of the refractive optical element.

Additionally, the term "solid material" refers to a material that is solid when the optical system is used. Before the optical system is used, for example, during a manufacturing time, the material can be in any state. For example, a material that is liquid during a manufacturing time and subsequently is solidified into a solid material also belongs to a category of a solid material.

For example, optical systems according to exemplary embodiments of the present invention can be of a retro focus type in which the height of paraxial marginal ray passing through the surface of the forefront lens is less than the maximum height of the paraxial marginal ray passing through a surface of a lens at a position at the rear of an intersection point P of the optical axis with paraxial chief ray.

As used herein, the term "paraxial marginal ray" refers to an entering paraxial ray in parallel to the optical axis, which can have a height of 1 from the optical axis, when the focal length of the entire optical system is normalized to 1. Also, the term "paraxial chief ray" refers to a paraxial ray passing through the intersection point of the entrance pupil of the optical system with the optical axis among rays entering at 45° with respect to the optical axis when the entire optical system is normalized to 1. The entering angle is positive when measured from the optical axis in the clockwise direction, while the entering angle is negative when measured from the optical axis in counterclockwise direction. It is assumed that an object lies at the left of the optical system and the rays entering the optical system from the object travel from the left to right.

The optical systems include at least one refractive optical element formed from a solid material that can satisfy the following conditional expressions:

$$-2.100 \times 10^{-3} \cdot \nu d + 0.693 < \theta gF \quad (1)$$

$$0.555 < \theta gF < 0.9 \quad (2)$$

where, when Ng, Nd, NF, and NC respectively represent the indices of refraction of the material for g-line, d-line, F-line, and C-line of Fraunhofer lines, $$\nu d = (Nd-1)/(NF-NC),$$

$$\theta gF = (Ng-NF)/(NF-NC).$$

If at least one refractive optical element that satisfies conditional expressions (1) and (2) is disposed at the front of the intersection point P, the refractive optical element can have a shape so that a negative refractive power increases towards the periphery of the optical element from the optical axis. In contrast, if at least one refractive optical element that satisfies conditional expressions (1) and (2) is disposed at the rear of the intersection point P, the refractive optical element can have a shape so that a positive refractive power increases towards the periphery of the optical element from the optical axis.

Alternatively, if at least one refractive optical element that satisfies conditional expressions (1) and (2) is disposed at the front of the intersection point P, the refractive optical element has a shape so that the thickness of the refractive optical element at a position of about 70% of the maximum effective ray diameter is greater than that on the optical axis. In contrast, if at least one refractive optical element that satisfies conditional expressions (1) and (2) is disposed at the rear of the intersection point P, the refractive optical element can have a shape so that the thickness of the refractive optical element at a position of about 70% of the maximum effective diameter is less than that on the optical axis. Note that the discussion of exemplary embodiments herein refer to 70% as an example, however other values can be used in the exemplary embodiments.

According to these exemplary embodiments, by using a solid material that can satisfy conditional expressions (1) and (2) for a refractive optical element having an appropriate power or an appropriate shape in an optical system, chromatic aberration can be well corrected and/or reduced across a wide wavelength range from g-line to C-line.

If the optical system does not satisfy either one of conditional expressions (1) and (2), it can be difficult to sufficiently correct and/or reduce the chromatic aberration.

The operation of a refractive optical element for the correction and/or reduction of aberration is now herein described when the refractive optical element used in the optical system is formed from an optical material of a high partial dispersion ratio.

In a wavelength dependent characteristic (dispersion characteristic) of the index of refraction of an optical material, the Abbe number represents the overall slope of the dispersion characteristic curve, while the partial dispersion ratio represents the curvature of the dispersion characteristic curve.

In general, an optical material has the index of refraction that is higher in a short wavelength zone than in a long wavelength zone (i.e., the Abbe number is positive). The dispersion characteristic curve has a convex downward shape (i.e., the partial dispersion ratio is positive). As the wavelength becomes shorter, the change in the index of refraction increases with respect to the change in the wavelength. Additionally, a higher dispersion optical material whose Abbe number is smaller has a higher partial dispersion ratio. Therefore, the dispersion characteristic curve tends to exhibit the strong convex downward shape.

In terms of an optical material of a high partial dispersion ratio, the wavelength dependent characteristic curve of chromatic aberration coefficient of a surface of a lens using this optical material exhibits a larger curve than that of a lens using an optical material of a smaller partial dispersion ratio in a short wavelength zone.

According to the exemplary embodiments of the present invention, an optical material of a higher partial dispersion ratio than that of a normal lens material is selected from among extraordinary partial dispersion materials so as to sufficiently correct and/or reduce the chromatic aberration in the entire wavelength zone of the whole optical system.

When the optical material of a higher partial dispersion ratio than that of a normal lens material is used, the wavelength dependent characteristic curve of chromatic aberration coefficient of a surface of a lens using this optical material exhibits a larger curvature in the short wavelength zone. This is the difference between a material of a high partial dispersion ratio and a material of a low partial dispersion ratio.

Additionally, the curvature in a short wavelength zone is caused by the curvature of the dispersion characteristic of the optical material. Three optical materials are now herein described that have, for simplicity, the same index of refraction for d-line and the same Abbe number but different partial dispersion ratios. A first material, a second material, and a third material having a high partial dispersion ratio, a normal partial dispersion ratio, and a low partial dispersion ratio, respectively. The second material is a currently widely used one. When these three materials are used for lenses of the same power, let the differences between the chromatic aberration coefficients of these three materials in the short wavelength zone and in the long wavelength zone be $\Delta N_H$, $\Delta N_M$, and $\Delta N_L$, respectively. Then, the relationship among these differences is expressed as follows:

$$\Delta N_H > \Delta N_M > \Delta N_L > 0 \quad (a)$$

Here, an optical system is discussed that includes a combination of two lenses, one of which is formed from an extraordinary partial dispersion material.

First, a case is discussed in which two lenses, which can have the same power, can be arranged in parallel, one of the two lenses is formed from a material of a normal partial dispersion ratio, and the other of the two lenses is formed from a material of a low partial dispersion ratio. The difference between the chromatic aberration coefficients in the short wavelength zone and in the long wavelength zone of this optical system is: $\Delta N_M + \Delta N_L$. This value is less than that when two lenses of a material of a normal partial dispersion ratio are used by $\Delta N_M - \Delta N_L$.

That is, this structure (one lens of a normal partial dispersion and a lens of low partial dispersion) can reduce the chromatic aberration compared with the structure using two lenses of a material of a normal partial dispersion ratio.

Secondly, a case is discussed in which two lenses, which can have the same power, can be arranged in parallel, one of the two lenses is formed from a material of a normal partial dispersion ratio, and the other of the two lenses is formed from a material of a high partial dispersion ratio. The difference between the chromatic aberration coefficients in the short wavelength zone and in the long wavelength zone of this optical system is: $\Delta N_M + \Delta N_H$. This value is larger than that when two lenses of a material of a normal partial dispersion ratio are used by $\Delta N_H - \Delta N_M$.

Accordingly, when a material having a less curvature in the short wavelength zone of a wavelength dependent characteristic curve of the chromatic aberration coefficient (i.e., a material having a small partial dispersion ratio) is used, the chromatic aberration in the short wavelength zone can be reduced. Conversely, when a material having a larger curvature in the short wavelength zone of the wavelength dependent characteristic curve of the chromatic aberration coefficient (i.e., a material of a high partial dispersion ratio) is used, the chromatic aberration in the short wavelength zone is increased. However, this is true in the case where a material of a high partial dispersion ratio and a material of a low partial dispersion ratio are used with the same power.

In the above-described state, the polarity of the power of the lens formed from a material of a high partial dispersion ratio is revered. That is, the polarity of the power of one of the two lenses arranged in parallel is reversed and a material of a high partial dispersion ratio can be used for that lens. In this structure, when a material of a high partial dispersion ratio is used, the aberration in the short wavelength zone can be reduced by $\Delta N_H - \Delta N_M$, contrary to the case where two lenses of a material of a normal partial dispersion ratio are used.

A combination of materials of a normal partial dispersion ratio rarely corrects a curve component and a slope component of the wavelength dependent characteristic curve of chromatic aberration coefficient in the entire wavelength zone contemporaneously. Accordingly, by appropriately using a material of a low partial dispersion ratio that can reduce a curve component in the short wavelength zone compared with a lens material of a normal partial dispersion ratio, the chromatic aberration can be reduced. However, in the viewpoint of reducing the chromatic aberration in the short wavelength zone, by using a material of a high partial dispersion ratio with reverse polarity of power to a material of a low partial dispersion ratio, the same effect can be obtained. It is noted that the power of reverse polarity also can cause a reverse effect in a zone other than the short wavelength zone for a material of a high partial dispersion ratio and a material of a low partial dispersion ratio. Accordingly, to accommodate this operation, other lens materials of the optical system are conversely operated.

This operation is now herein described with reference to the achromatic operation of an optical system including a refractive optical system portion GIT using a material of a high partial dispersion ratio and a refractive optical system portion G using a material of a normal partial dispersion ratio.

Chromatic aberration of the portion G, which is a partial system of the optical system, is corrected or error reduced to a degree, first. Subsequently, a material of an equivalently high partial dispersion ratio is selected for one of negative lenses of the portion G. In general, since a material of a high partial dispersion ratio is also of a high dispersion, the overall slope of the wavelength dependent characteristic curve of chromatic aberration coefficient of the portion G changes while the curve is being largely changed from the original shape.

At that time, an appropriate power is applied to the portion GIT, and a material of an equivalently high partial dispersion ratio is also selected for a positive lens of the portion G. However, if the portion GIT is formed from a normal optical material, which can have a uniform partial dispersion ratio with respect to the Abbe number, the portion GIT contributes both a curve component and a slope component of the wavelength dependent characteristic curve of chromatic aberration coefficient of the portion G to some extent contemporaneously. Thus, it is difficult for the portion GIT to cancel both the curve component and a slope component.

In contrast, if the portion GIT is formed from a material, which can have a high partial dispersion ratio compared with a normal material, the portion GIT primarily contributes a curve component of the wavelength dependent characteristic curve of chromatic aberration coefficient of the portion G, and therefore, the portion GIT can primarily cancel or reduce the curve component.

Thus, the portion GIT can independently and primarily cancel and/or reduce the curve component of the entire wavelength dependent characteristic curve of chromatic aberration of the portion G. Contemporaneously, the positive lens of the portion G can independently and primarily cancel and/or reduce the slope component.

Additionally, in at least one exemplary embodiment the absolute value of the Abbe number of the portion GIT is small (i.e., the dispersion is high) since chromatic aberration can be reduced independently. This principal is now herein described with reference to an axial chromatic aberration coefficient and a coefficient of chromatic aberration of magnification (transverse chromatic aberration).

Let $\Delta\phi$ be the change in power on the surface of a refractive lens. Then, the change $\Delta L$ of the axial chromatic aberration coefficient and the change $\Delta T$ in the coefficient of chromatic aberration of magnification are expressed as follows:

$$\Delta L \propto \Delta\phi/\nu \quad (b)$$

$$\Delta T \propto \Delta\phi/\nu \quad (c)$$

As can be seen from equations (b) and (c), the changes $\Delta L$ and $\Delta T$ in the coefficients of aberration with respect to the change in the power of the lens surface increase as the absolute value of the Abbe number $\nu$ decreases (i.e., the dispersion increases). Therefore, by using a high dispersion material that has a small absolute value of the Abbe number ν, the change amount of power can be decreased in order to obtain the required chromatic aberration. This means that, from the aberration theory, chromatic aberration can be controlled without largely affecting spherical aberration, coma aberration, and astigmatism, and the independence of chromatic aberration correction and/or reduction is increased.

Conversely, if a low dispersion material is used, the change amount of power is increased in order to obtain the required chromatic aberration. Thus, the various aberrations (e.g., spherical aberration) largely change, and therefore, the independence of chromatic aberration correction and/or reduction is decreased. Accordingly, it can be useful that at least one of the lens surfaces of the lenses of an optical system is a refractive lens surface formed from a high dispersion material from the viewpoint of aberration correction.

In addition, since the refractive optical system portion GIT can be used together with a normal optical material, the partial dispersion ratio of a material used for the portion GIT should not be significantly different from that of the normal material, although the partial dispersion ratio of a material used for the portion GIT can be different from that of the normal optical material.

If a material whose partial dispersion ratio is largely different from that of the normal optical material is used for a lens, the curvature of the wavelength dependent characteristic curve of chromatic aberration coefficient of the lens surface becomes large, in particular, in the short wavelength zone. To cancel and/or reduce the large curvature, the power of other lenses can be increased. This results in large affect on spherical aberration, coma aberration, and astigmatism, and therefore, aberration control becomes difficult.

That is, it can be useful that a material for the portion GIT has a larger partial dispersion ratio than a normal optical material, and also, the portion GIT does not have too large partial dispersion ratio compared with the normal optical material. The foregoing conditional expressions (1) and (2) describe the relationship between the Abbe number νd and the partial dispersion ratio θgF to sufficiently correct and/or reduce chromatic aberration according to the above-described principal.

In the optical systems according to exemplary embodiments of the present invention, in at least one exemplary embodiment a solid material can satisfy conditional expressions (1) and (2) and can further satisfy the following conditional expressions (3) and (4):

$$-2.407 \times 10^{-3} \cdot \nu d + 1.420 < \theta gd \quad (3)$$

$$1.255 < \theta gd < 1.67 \quad (4)$$

where θgd=(Ng−Nd)/(NF−NC).

Satisfying conditional expressions (3) and (4) in addition to conditional expressions (1) and (2) facilitates correction and/or reduction of chromatic aberration between g-line and d-line. Thus, more precise correction of chromatic aberration can be easily carried out over a wavelength range from g-line to C-line.

Furthermore, from the viewpoint of chromatic aberration correction, in at least one exemplary embodiment the following conditional expression can be further satisfied:

$$\nu d < 60 \quad (5)$$

The conditions that a solid material of a refractive optical element according to some exemplary embodiments of the present invention can satisfy have been described so far.

Now, in a retro focus optical system, the conditions for the refractive optical system portion GIT that facilitate correction and/or reduction of chromatic aberration are described with reference to FIG. 1.

FIG. 1 is a schematic diagram of a paraxial refractive power layout for illustrating the operation of correcting and/or reducing chromatic aberration of a retro focus optical system. In FIG. 1, Gn and Gp represent a front component of negative refractive power and a rear component of positive refractive power of the retro focus optical system, respectively. For the sake of simplicity, each of the lenses of the front component Gn and the rear component Gp is a thin single lens. In the front component Gn and the rear component Gp, all the lenses are spaced on the optical axis by a distance of zero. Q denotes a paraxial marginal ray. R denotes a paraxial chief ray. P denotes an intersection point of the paraxial chief ray R with an optical axis La. In general, the intersection point P coincides with the center of an aperture stop. hn and hp are entrance heights of the paraxial marginal ray Q on lens surfaces. Hn and Hp are entrance heights of the paraxial chief ray R on the front component (forefront lens surface) and the rear component respectively. As used herein, the term "retro focus optical system" refers to an optical system in which the height of the paraxial marginal ray Q passing through the forefront lens surface is smaller than the maximum height, from the optical axis, of the paraxial marginal ray Q passing through a lens surface (in the rear component) at the rear of the intersection point P.

First, an optical system before the portion GIT is introduced is discussed. The aberration coefficient (L) of axial chromatic aberration and the aberration coefficient (T) of chromatic aberration of magnification in the front component Gn and the rear component Gp are expressed as follows:

$$L(\lambda) = h_{Gn}^2(\lambda_0) \sum_{i=1}^{L} \Phi_{Gni}(\lambda_0)/\nu_{Gni}(\lambda) + h_{Gp}^2(\lambda_0) \sum_{j=1}^{M} \Phi_{Gpj}(\lambda_0)/\nu_{Gpj}(\lambda) \quad (d)$$

$$T(\lambda) = h_{Gn}(\lambda_0) H_{Gn}(\lambda_0) \sum_{i=1}^{L} \Phi_{Gni}(\lambda_0)/\nu_{Gni}(\lambda) + \quad (e)$$

$$h_{Gp}(\lambda_0) H_{Gp}(\lambda_0) \sum_{j=1}^{M} \Phi_{Gpj}(\lambda_0)/\nu_{Gpj}(\lambda)$$

where $\nu_{Gni}(\lambda) = \{N_{Gni}(\lambda_0) - 1\}/\{N_{Gni}(\lambda) - N_{Gni}(\lambda_0)\}$, $\nu_{Gpj}(\lambda) = \{N_{Gpj}(\lambda_0) - 1\}/\{N_{Gpj}(\lambda) - N_{Gpj}(\lambda_0)\}$, $\Phi_{Gni}$: refractive power (optical power) of a thin single lens of the front component Gn, $\Phi_{Gpj}$: refractive power (optical power) of a thin single lens of the rear component Gp, $\nu_{Gni}$: Abbe number of a thin single lens of the front component Gn, $\nu_{Gpj}$: Abbe number of a thin single lens of the rear component Gp, $h_{Gn}$: height of the paraxial marginal ray entering the front component Gn, $h_{Gp}$: height of the paraxial marginal ray entering the rear component Gp, $H_{Gn}$: height of the paraxial chief ray entering the front component Gn, $H_{Gp}$: height of the paraxial chief ray entering the rear component Gp, $N_{Gni}$: the index of refraction of a thin single lens of the front component Gn, $N_{Gpj}$: the index of refraction of a thin single lens of the rear component Gp, λ: any wavelength, and $λ_0$: design wavelength.

In general, in a retro focus optical system, the wavelength dependent characteristic of axial chromatic aberration coefficient expressed by equation (d) exhibits a negative overall slope and a convex upward shape. Additionally, the wavelength dependent characteristic of chromatic aberration of magnification expressed by equation (e) exhibits a negative overall slope and a convex upward shape.

Subsequently, in this structure, the polarity and the introduced location of the refractive optical system portion GIT are discussed in order to correct and/or reduce the axial chromatic aberration and the chromatic aberration of magnification. The axial chromatic aberration coefficient $L_{GIT}$ and the coefficient of chromatic aberration of magnification $T_{GIT}$ of the refractive optical system portion GIT are expressed as follows:

$$L_{GIT}(λ)=h_{GIT}^2(λ_0)Φ_{GIT}(λ_0)/ν_{GIT}(λ) \quad (f)$$

$$T_{GIT}(λ)=h_{GIT}(λ_0)H_{GIT}(λ_0)Φ_{GIT}(λ_0)/ν_{GIT}(λ) \quad (g)$$

where $Φ_{GIT}(λ_0)$ represents the refractive power (optical power) of the refractive optical system portion GIT, $h_{GIT}(λ_0)$ represents the height of a paraxial marginal ray entering the refractive optical system portion GIT, $H_{GIT}(λ_0)$ represents the height of a paraxial chief ray entering the refractive optical system portion GIT, and $ν_{GIT}(λ)=\{N_{GIT}(λ_0)-1\}/\{N_{GIT}(λ)-N_{GIT}(λ_0)\}$.

In equations (f) and (g), the trend of the slope and the curve components of the dispersion characteristic $N_{GIT}(λ)$ of the portion GIT is directly reflected to $1/ν_{GIT}(λ)$. When the portion GIT is disposed at the front of the intersection point P and $Φ_{GIT}(λ_0)>0$, the wavelength dependent characteristic curve of the coefficient of axial chromatic aberration exhibits a negative overall slope and the convex downward shape, and the wavelength dependent characteristic curve of the coefficient of chromatic aberration of magnification exhibits a positive overall slope and the strong convex upward shape. Additionally, when $Φ_{GIT}(λ_0)<0$, the wavelength dependent characteristic curve of the coefficient of axial chromatic aberration exhibits a positive overall slope and the strong convex upward shape, and the wavelength dependent characteristic curve of the coefficient of chromatic aberration of magnification exhibits a negative overall slope and the strong convex downward shape.

In contrast, when the portion GIT is disposed at the rear of the intersection point P and $Φ_{GIT}(λ_0)>0$, the wavelength dependent characteristic curve of the coefficient of axial chromatic aberration exhibits a negative overall slope and the strong convex downward shape, and the wavelength dependent characteristic curve of the coefficient of chromatic aberration of magnification exhibits a negative overall slope and the strong convex downward shape. Additionally, when $Φ_{GIT}(λ_0)<0$, the wavelength dependent characteristic curve of the coefficient of axial chromatic aberration exhibits a positive overall slope and a strong convex upward shape, and the wavelength dependent characteristic curve of the coefficient of chromatic aberration of magnification exhibits a positive overall slope and a strong convex upward shape.

Accordingly, in order to cancel and/or reduce the overall curve components of the wavelength dependent characteristic curve of the coefficient of axial chromatic aberration and the wavelength dependent characteristic curve of the coefficient of chromatic aberration of magnification in the entire optical system, both the contours of the wavelength dependent characteristic curve of the coefficient of axial chromatic aberration and the wavelength dependent characteristic curve of the coefficient of chromatic aberration of magnification are required to have a convex-downward characteristic.

For this reason, when the portion GIT is disposed in the front component Gn (i.e., when the portion GIT is disposed at the front of the intersection point P), a condition can be set so that $Φ_{GIT}(λ_0)>0$ in the front component Gn in order to cancel and/or reduce the overall slope component of the wavelength dependent characteristic curve of the coefficient of axial chromatic aberration. On the other hand, in order to cancel and/or reduce the overall slope component of the wavelength dependent characteristic curve of the coefficient of chromatic aberration of magnification, a condition can be set so that $Φ_{GIT}(λ_0)<0$ in the front component Gn. Therefore, the axial chromatic aberration and the chromatic aberration of magnification cannot be reduced contemporaneously by disposing the portion GIT in the front component Gn. However, in general, axial chromatic aberration occurs in proportion to a focal length, and chromatic aberration of magnification occurs more as the angle of a lens becomes wider. Consequently, for retro focus optical systems, the occurrence of chromatic aberration of magnification can be more serious. Thus, when the portion GIT is disposed in the front component Gn, it is determined that $Φ_{GIT}(λ_0)<0$, thereby providing a high-performance optical system in which the chromatic aberration of magnification is primarily corrected.

Additionally, the arrangement of the portion GIT, which can have the property "$Φ_{GIT}(λ_0)<0$" in the front component Gn, can over-correct the curve component of the wavelength dependent characteristic curve of the coefficient of chromatic aberration of magnification. Therefore, a material of a low partial dispersion ratio (i.e., small curve of dispersion characteristic) can be employed for a positive lens in the front component Gn, and a material of a high partial dispersion ratio (i.e., strong curve of dispersion characteristic) is employed for a negative lens in the front component Gn. Thus, the wavelength dependent characteristic curve of the coefficient of axial chromatic aberration and the wavelength dependent characteristic curve of the coefficient of chromatic aberration of magnification of the entire system other than the portion GIT have a large negative slope and a strongly convex profile. This can reduce the above-described over-correction problem of chromatic aberration of magnification. The largely shifted overall slope caused by the change in the lens material can be reduced by displacing the refractive power $Φ_{GIT}(λ_0)$ of the portion GIT towards a negative direction again. Thus, the wavelength dependent characteristic curve of the coefficient of axial chromatic aberration whose overall slope component and curve component are well corrected can be obtained.

The case where the portion GIT is disposed in the rear component Gp (i.e., the portion GIT is disposed at the rear of the intersection point P) is now herein discussed. In this case, in order to cancel and/or reduce the overall slope component of the wavelength dependent characteristic curve of the coefficient of axial chromatic aberration, a condition can be set so that $Φ_{GIT}(λ_0)>0$ in the rear component Gp. Since the portion GIT is of a material of a high partial dispersion ratio, the curve component is over-corrected both for the axial chromatic aberration and the chromatic aberration of magnification. However, a material of a low partial dispersion ratio (i.e., small curve of dispersion characteristic) can be employed for a positive lens in the rear component Gp, and a material of a high partial dispersion ratio (i.e., strong curve of dispersion characteristic) is employed for a negative lens in the rear component Gp. Thus, the wavelength dependent characteristic curve of the coefficient of axial chromatic aberration and the wavelength dependent characteristic curve of the coefficient of chromatic aberration of magnification of the entire system other than the portion GIT have a large negative slope and a strong convex upward profile. This can reduce the above-described over-correction problem of the axial chromatic aberration and chromatic aberration of magnification. The largely shifted overall slope caused by the change in the lens material can be corrected by displacing the refractive power $\Phi_{GIT}(\lambda_0)$ of the portion GIT towards a negative direction again. Thus, when the portion GIT is disposed in the rear component Gp, the wavelength dependent characteristic curve of the coefficient of axial chromatic aberration whose overall slope component and curve component are well corrected and/or error reduced can be obtained.

In addition, in optical systems of wide angle, an area where an area where axial rays pass through do not overlap an area where off-axis rays pass through can exist. In particular, that area increases with the forefront lens or the rearmost lens. Also, that area increases with the wider-angle optical system. Accordingly, by disposing the portion GIT at the location that can provide a wide area where an area where axial rays pass through do not overlap an area where off-axis rays pass through and by providing a refractive power to the portion GIT such that $\Phi_{GIT}(\lambda_0) \geq 0$ in an area around an optical axis in which axial rays of the portion GIT pass through and $\Phi_{GIT}(\lambda_0) < 0$ in the other area, an optical system in which the chromatic aberration of magnification is corrected or error reduced without degrading the axial chromatic aberration can be achieved. For example, the portion GIT can be provided as an aspherical lens (layer) in which $\Phi_{GIT}(\lambda_0) \geq 0$ in an area around an optical axis in which axial rays of the portion GIT pass through and $\Phi_{GIT}(\lambda_0) < 0$ in the other area.

The conditions that a refractive optical element of a high partial dispersion ratio (i.e., portion GIT) should satisfy have been described so far.

Conditions for a refractive optical element that satisfies conditional expressions (1) and (2) used for the optical system according to at least one exemplary embodiment are now herein described.

When the portion GIT is disposed at the front of the intersection point P, the following condition can be satisfied:

$$0 < |\phi GIT1/\phi| < 0.5 \quad (6)$$

where $\phi GIT1$ represents the refractive power of the portion GIT itself at a standard wavelength (refractive power when the entrance and exit sides of the portion GIT are in contact with the air) and $\phi$ represents the refractive power of the entire optical system at a standard wavelength (refractive power at a wide-angle end when the optical system is a zoom lens).

By determining the refractive power of the portion GIT within the range defined by conditional expression (6), various aberrations, such as chromatic aberration and spherical aberration, can be well balanced when the portion GIT is disposed at the front of the intersection point P. Thus, an improved optical performance can be obtained.

In at least one exemplary embodiment the condition can be expressed as (6a):

$$0 < |\phi GIT1/\phi| < 0.3 \quad (6a)$$

In another exemplary embodiment the condition can be expressed as (6b):

$$0 < |\phi GIT1/\phi| < 0.15 \quad (6b)$$

When the portion GIT is disposed at the rear of the intersection point P, the following condition can be satisfied:

$$0 < |\phi GIT2/\phi| < 1.0 \quad (7)$$

where $\phi GIT2$ represents the refractive power of the portion GIT at a standard wavelength and $\phi$ represents the refractive power of the entire optical system at a standard wavelength (refractive power at a wide-angle end when the optical system is a zoom lens).

By determining the refractive power of the portion GIT within the range defined by conditional expression (7), various aberrations, such as chromatic aberration and spherical aberration, can be well balanced when the portion GIT is disposed at the rear of the intersection point P. Thus, an improved optical performance can be provided.

In at least one exemplary embodiment the condition can be expressed as (7a) is:

$$0 < |\phi GIT2/\phi| < 0.48 \quad (7a)$$

In yet another exemplary embodiment the condition can be expressed as (7b) is:

$$0 < |\phi GIT2/\phi| < 0.36 \quad (7b)$$

In terms of a solid material of the portion GIT, in at least one exemplary embodiment the following condition can be satisfied:

$$|dn/dT| < 2.5 \times 10^{-4} \quad (8)$$

where $|dn/dT|$ is the absolute value of the change in the index of refraction for d-line with respect to a temperature in the range from 0° C. to 40° C. (greater than or equal to 0° C. and less than or equal to 40° C.).

If conditional expression (8) is not satisfied, a satisfactory optical performance cannot be ensured within the temperature range from 0° C. to 40° C.

As used herein, the term "retro focus optical system" refers to an optical system that satisfies the following condition:

$$2 < OTL/f < 15$$

where OTL is the total optical length of the optical system and f is the focal length of the optical system. When the optical system is a zoom lens, OTL and f are values at a wide-angle end.

An optical material (solid material) of the portion GIT is now herein described in detail. Examples of solid optical materials that satisfy the above-described conditional expressions (1) and (2) include some resin materials. Among various resins, for example, a UV curable resin (Nd=1.635, vd=22.7, and θgF=0.69) and N-polyvinyl carbazole (Nd=1.696, vd=17.7, and θgF=0.69) satisfy the above-described conditional expressions (1) and (2).

Additionally, examples of a material that has a different characteristic from that of a normal lens material include a mixture of inorganic oxide particles dispersed in a synthetic resin. Examples of the particles of inorganic oxide include $TiO_2$ (Nd=2.304 and vd=13.8), $Nb_2O_5$ (Nd=2.367 and vd=14.0), ITO (Nd=1.8581 and vd=5.53), $Cr_2O_3$ (Nd=2.2178 and vd=13.4), and $BaTiO_3$ (Nd=2.4362 and vd=11.3).

Among these particles, $TiO_2$ (Nd=2.304, vd=13.8, and θgF=0.87) particles can make an optical material that satisfies the above-described conditional expressions (1) and (2) when the particles are dispersed in a synthetic resin.

$TiO_2$ is used in a variety of technical fields. In an optical application, $TiO_2$ can be used for a material for evaporation to generate an optical thin film, such as a reflection preventing film.

Furthermore, $TiO_2$ particles are used for an optical catalyst and a white pigment, which is a material of cosmetics. In this exemplary embodiment, the mixture of $TiO_2$ particles and a synthetic resin can be used as a solid material that satisfies conditional expressions (1) and (2) to correct and/or reduce chromatic aberration of an optical system.

In at least one exemplary embodiment the mean diameter of the $TiO_2$ particles is about 2 to 50 nm when taking into consideration the effect of light scattering. A dispersing agent can be mixed with the $TiO_2$ particles to reduce the chance of aggregation.

The optimal medium that disperses the $TiO_2$ particles is a polymer, which can be photo-polymerized or thermal-polymerized using a molding tool. Thus, high productivity can be obtained.

Additionally, in terms of a characteristic of optical constants of a polymer, at least one exemplary embodiment the polymer has an equivalently high partial dispersion ratio, the polymer has an equivalently small Abbe number, or the polymer has the both. Examples of such a polymer include N-polyvinyl carbazole, styrene, and polymethylmethacrylate (acrylic resin). While a UV curable resin and N-polyvinyl carbazole are used as a host polymer in which the $TiO_2$ particles are dispersed in an embodiment described below, the polymer is not limited thereto.

The dispersion characteristic $N(\lambda)$ of the mixture in which nano particles are dispersed can be computed by the following equation which is derived from the well-known Drude equation:

$$N(\lambda) = [1 + V\{N_{TiO}^2(\lambda) - 1\} + (1-V)\{N_P^2(\lambda) - 1\}]^{1/2} \quad (i)$$

where $\lambda$ is any wavelength, $N_{TiO}$ is the index of refraction of nano particles, $N_P$ is the index of refraction of polymer, V is the volume fraction of total volume of nano particles to the volume of polymer.

In optical systems described in the following exemplary embodiments, a material that satisfies conditional expressions (1) and (2) can be used for a lens of the optical system or a layer formed on the surface of a lens of the optical system. Additionally, by aspherizing the refracting surface formed from this material, chromatic aberration flare, such as color spherical aberration, can be further corrected. Furthermore, by forming an interface between this material and the atmosphere (e.g., the air) or by forming an interface between this material and a material of an equivalently low refractive index, chromatic aberration can be equivalently largely changed with the slight change in the radius of curvature of the interface. Still furthermore, use of a plurality of materials that satisfy conditional expressions (1) and (2) in an optical system can reduce the power of each material. Thus, aberrations can be corrected and/or reduced.

Exemplary Embodiment 1

A material that satisfies conditional expressions (1) and (2) and that is applied to a particular optical system is now herein described. In the following exemplary embodiments, a UV curable resin or a $TiO_2$ particle dispersion material in which $TiO_2$ particle are dispersed in the UV curable resin serving as a host polymer is employed as a material that satisfies conditional expressions (1) and (2).

Figure 2:
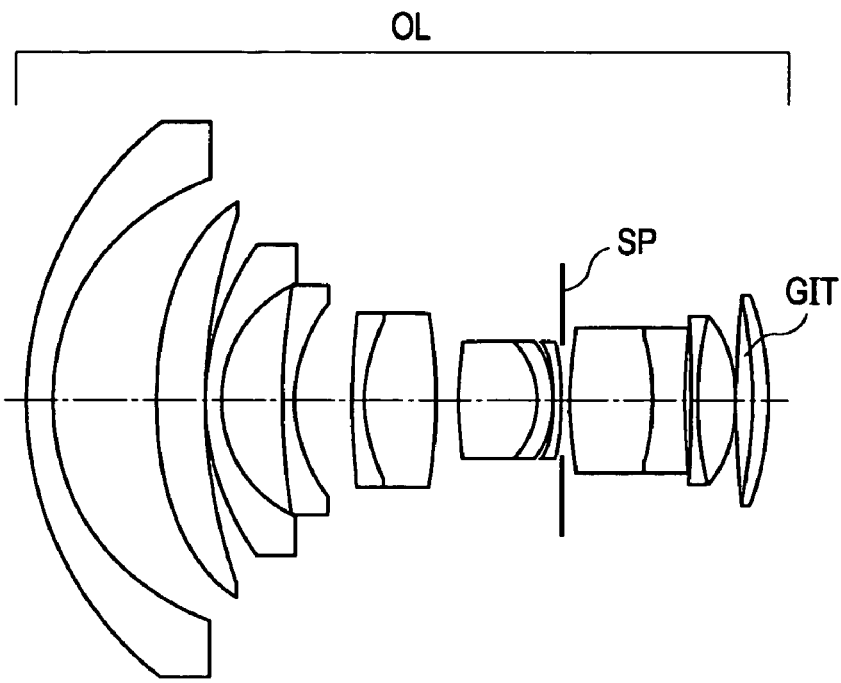
FIG. 2 is a sectional view of an optical system according to exemplary embodiment 1.

FIG. 2 is a sectional view of an optical system OL according to exemplary embodiment 1. In exemplary embodiment 1, a wide-angle lens (retro focus lens system), which can have a focal length of 14 mm, includes a refractive optical element formed from a mixture of $TiO_2$ particles dispersed in a UV curable resin. In FIG. 2, a lens (layer) formed from the mixture is designated as GIT. An aperture stop is designated as SP. In FIG. 2, an object lies at the left of the optical system (front side) and an image is present at the right of the optical system (rear side). This is the same for the other exemplary embodiments.

Figure 3:
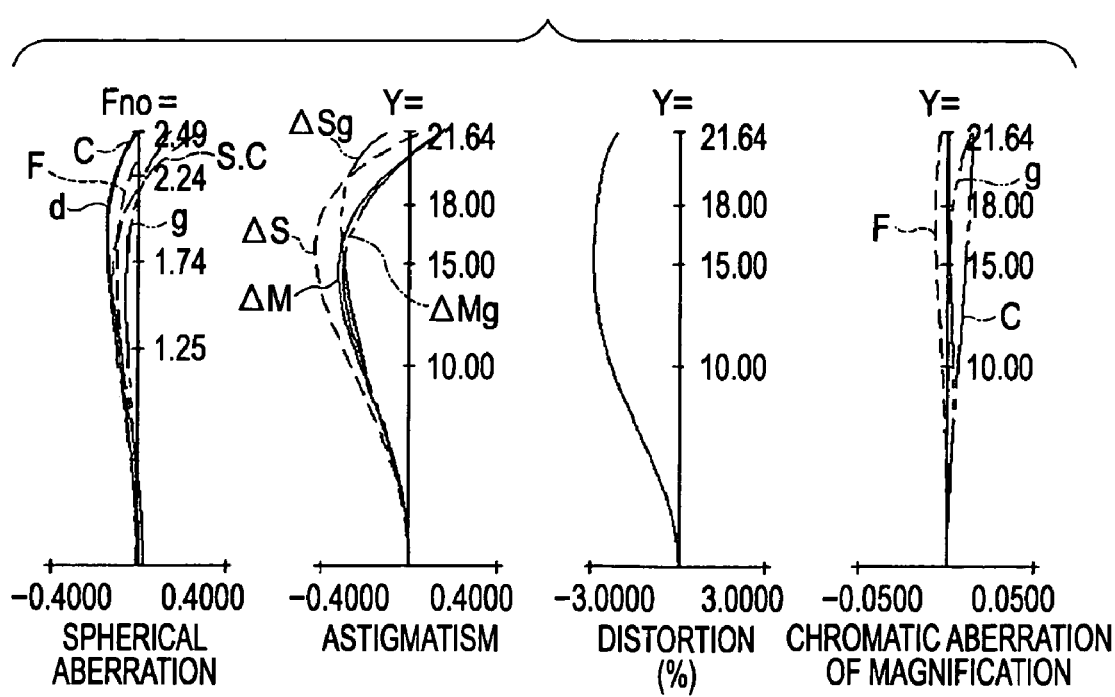
FIG. 3 illustrates aberration graphs of the optical system according to exemplary embodiment 1.

FIG. 3 illustrates aberration graphs of the optical system according to exemplary embodiment 1 when focusing on an object at infinity. In these aberration graphs shown are d-line d, g-line g, C-line C, F-line F, a sine condition S.C, a meridional image plane $\Delta M$, a sagittal image plane $\Delta S$, an image height Y, and an F number Fno. This is the same for the other exemplary embodiments.

In the optical system according to exemplary embodiment 1, a lens GIT is introduced at the rear side where the passing position of the paraxial chief ray R (FIG. 1) is equivalently high from the optical axis La. At that time, the lens GIT has a shape so that a positive refractive power increases towards the periphery from the optical axis. Thus, the positive refractive power is provided to the lens GIT, and axial chromatic aberration and chromatic aberration of magnification are corrected and/or reduced to obtain a high-performance optical system.

Exemplary Embodiment 2

Figure 4:
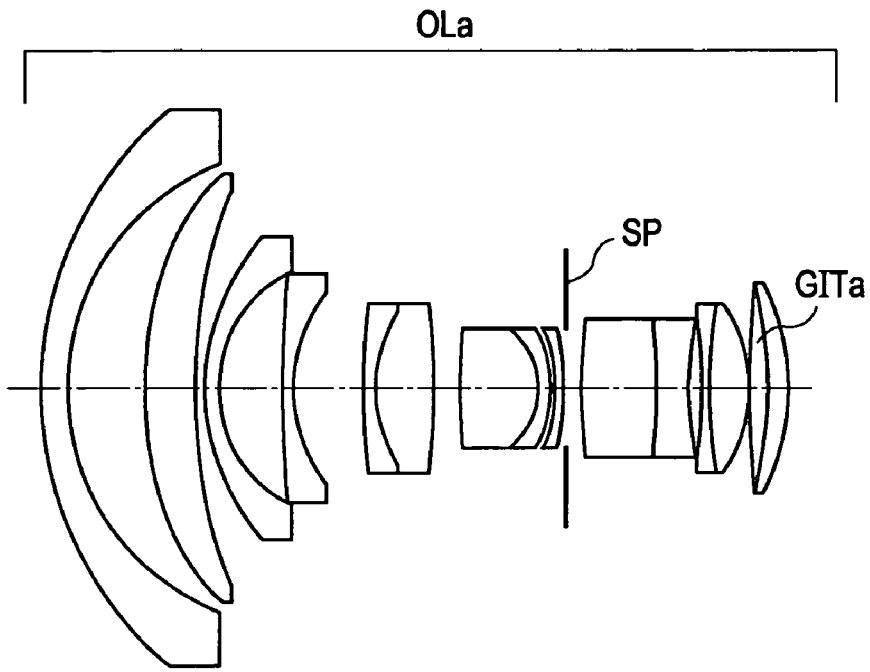
FIG. 4 is a sectional view of an optical system according to exemplary embodiment 2.
Figure 5:
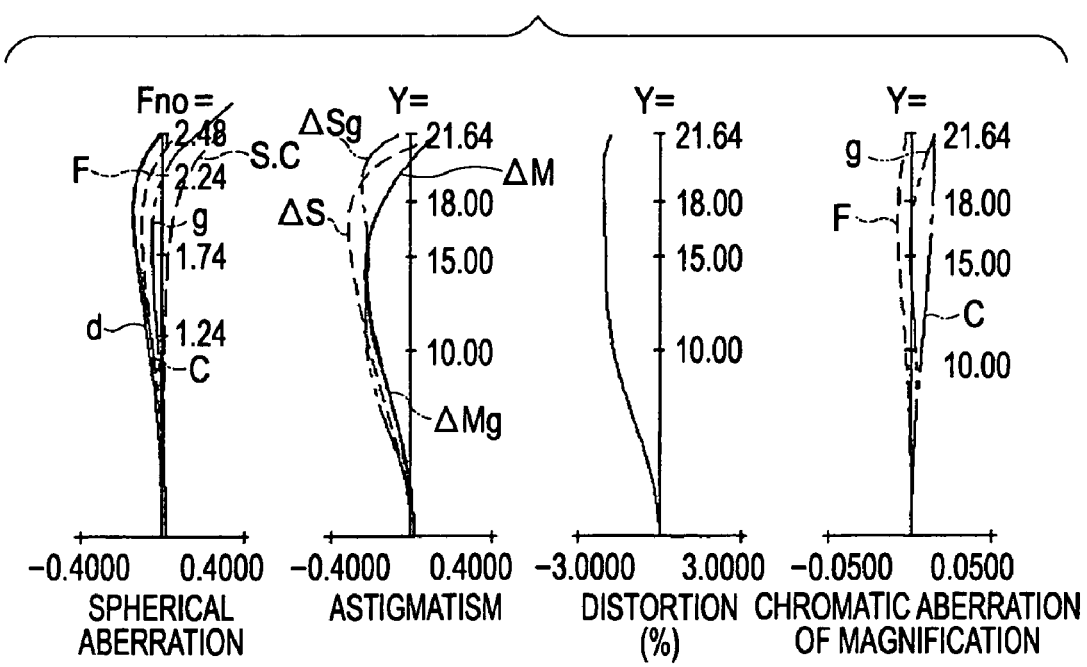
FIG. 5 illustrates aberration graphs of the optical system according to exemplary embodiment 2.

FIG. 4 is a sectional view of an optical system OLa according to exemplary embodiment 2. In exemplary embodiment 2, a wide-angle lens, which can have a focal length of 14 mm, includes a refractive optical element (e.g., formed from a mixture of $TiO_2$ particles dispersed in a UV curable resin). In addition, the surface of the refractive optical element can be aspherized. In FIG. 4, a lens (layer) formed from a $TiO_2$ particle dispersion material is designated as GIT. An aperture stop is designated as SP. FIG. 5 illustrates aberration graphs of the optical system according to exemplary embodiment 2 when focusing on an object at infinity.

In the optical system according to exemplary embodiment 2, a lens GITa is introduced at the rear side where the passing position of a paraxial chief ray R (FIG. 1) is equivalently high from the optical axis La. At that time, the lens GIT has a shape so that a positive refractive power increases towards the periphery from the optical axis. Thus, the positive refractive power is provided to the lens GIT and the axial chromatic aberration and chromatic aberration of magnification are corrected and/or reduced. Furthermore, the surface of the lens GIT can be aspherized so as to obtain a high-performance optical system that corrects various aberrations.

Exemplary Embodiment 3

Figure 6:
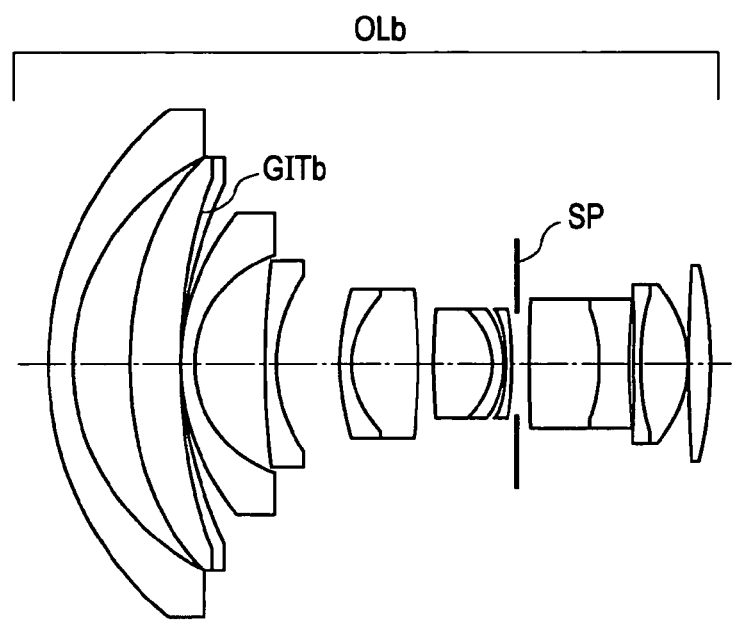
FIG. 6 is a sectional view of an optical system according to exemplary embodiment 3.
Figure 7:
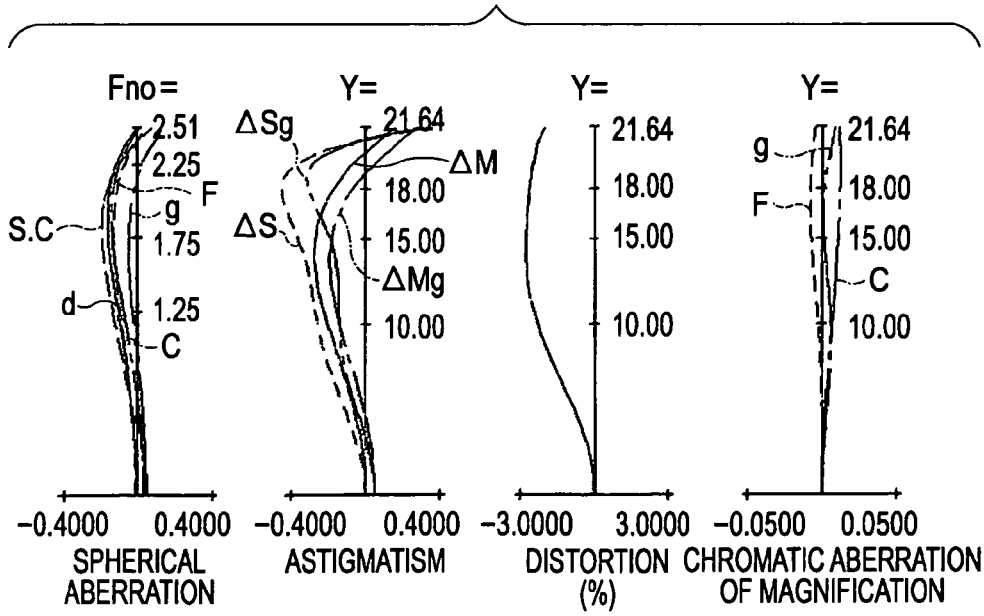
FIG. 7 illustrates aberration graphs of the optical system according to exemplary embodiment 3.

FIG. 6 is a sectional view of an optical system OLb according to exemplary embodiment 3. In exemplary embodiment 3, a wide-angle lens, which can have a focal length of 14 mm, includes a refractive optical element formed from a UV curable resin. In addition, the surface of the refractive optical element can be aspherized. In FIG. 6, a lens (layer) formed from the UV curable resin is designated as GITb. An aperture stop is designated as SP. FIG. 7 illustrates aberration graphs of the optical system according to exemplary embodiment 3 when focusing on an object at infinity.

In the optical system according to exemplary embodiment 3, a lens GITb is introduced at the front side where the passing position of a paraxial chief ray R (FIG. 1) is equivalently low from the optical axis La. At that time, the lens GITb has a shape so that a negative refractive power increases towards the periphery from the optical axis. Thus, the negative refractive power is provided to the lens GITb, and chromatic aberration of magnification is corrected or error reduced so as to obtain a high-performance optical system.

Exemplary Embodiment 4

Figure 8:
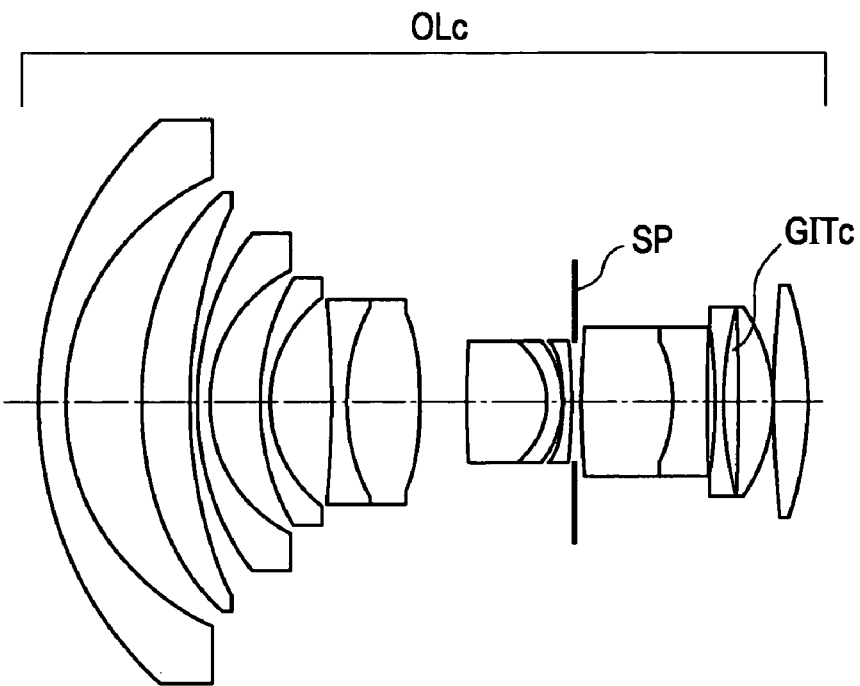
FIG. 8 is a sectional view of an optical system according to exemplary embodiment 4.
Figure 9:
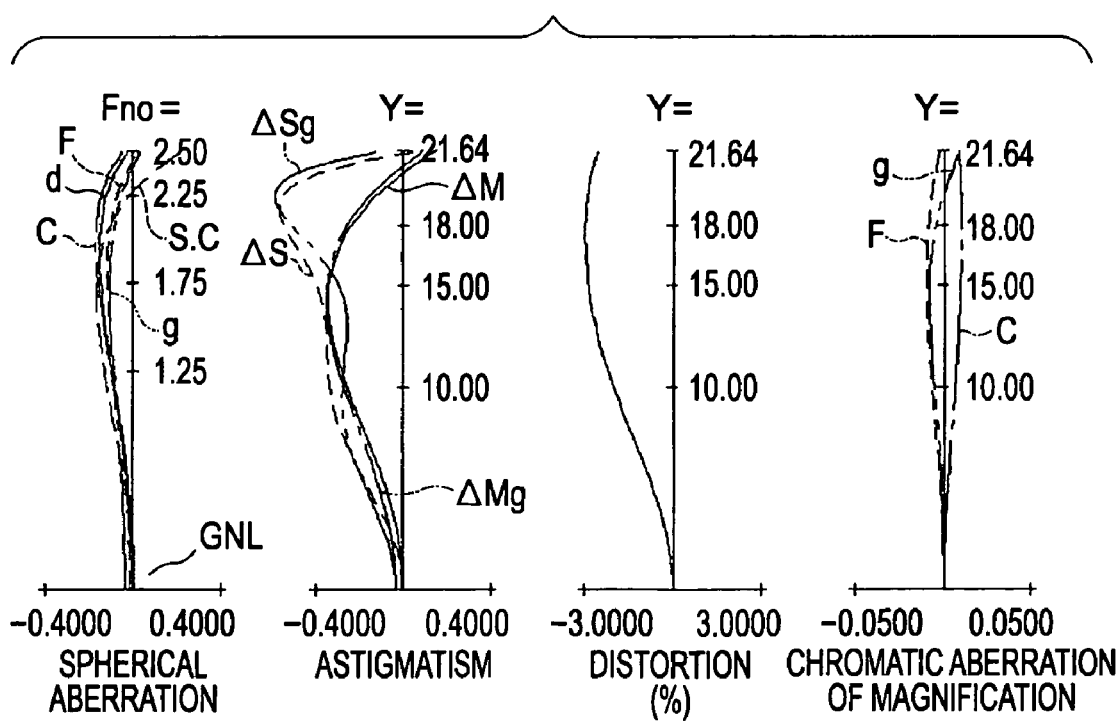
FIG. 9 illustrates aberration graph of the optical system according to exemplary embodiment 4 when focusing on an object at infinity.

FIG. 8 is a sectional view of an optical system OLc according to exemplary embodiment 4. In exemplary embodiment 4, a wide-angle lens, which can have a focal length of 14 mm, includes a refractive optical element formed from a mixture of $TiO_2$ particles dispersed in a UV curable resin at a location where either side of the refractive optical element is in contact with glass. In FIG. 8, a lens (layer) formed from a $TiO_2$ particle dispersion material is designated as GITc. An aperture stop is designated as SP. FIG. 9 illustrates aberration graphs of the optical system according to exemplary embodiment 4 when focusing on an object at infinity.

In an optical system according to exemplary embodiment 4, a lens GITc is introduced at a location where the passing position of a paraxial chief ray R is equivalently high from the optical axis La and where either side of the refractive optical element is in contact with glass. Thus, a positive refractive power is provided to the lens GITc, and axial chromatic aberration and chromatic aberration of magnification are corrected and/or reduced. In addition, the surface of the refractive optical element is aspherized so as to obtain a high-performance optical system.

Exemplary Embodiment 5

Figures 10A, 10B, 10C:
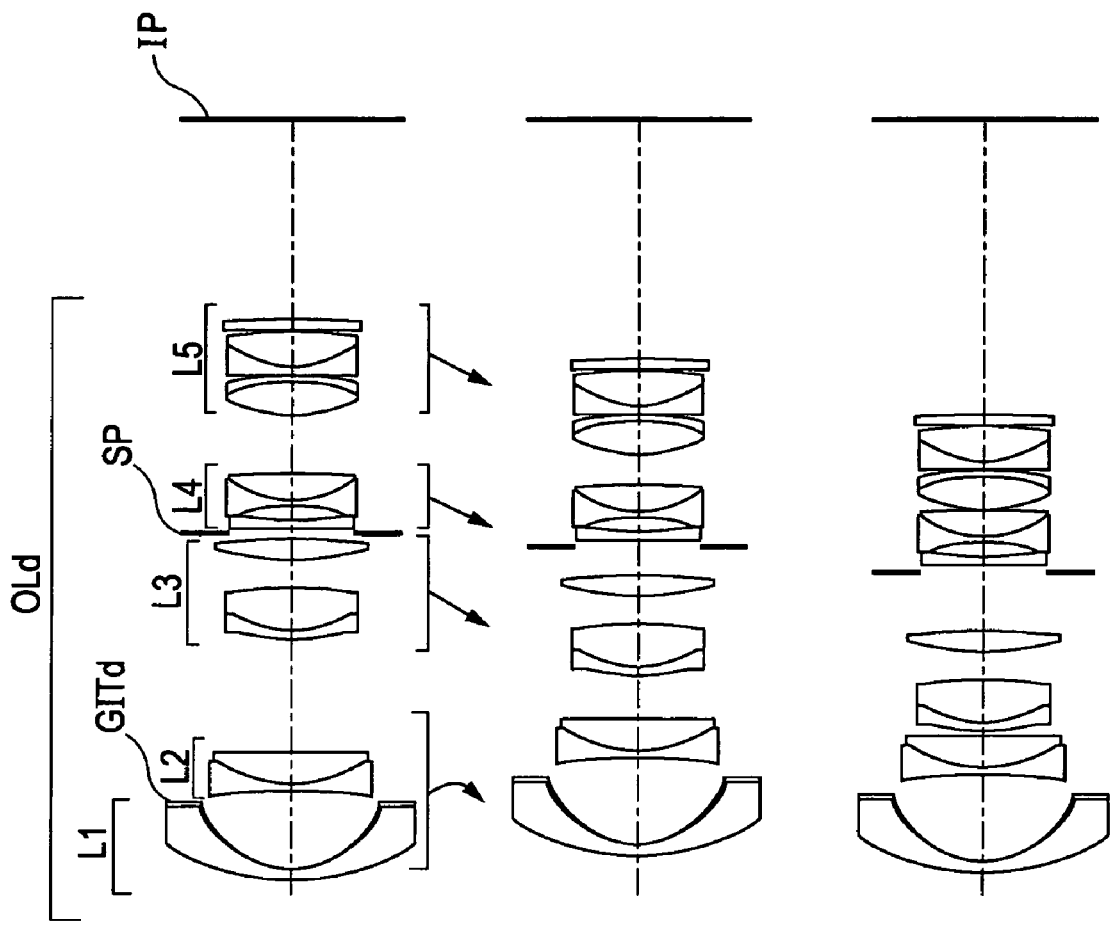
FIGS. 10A-C are sectional views of an optical system according to exemplary embodiment 5.
Figure 11A:
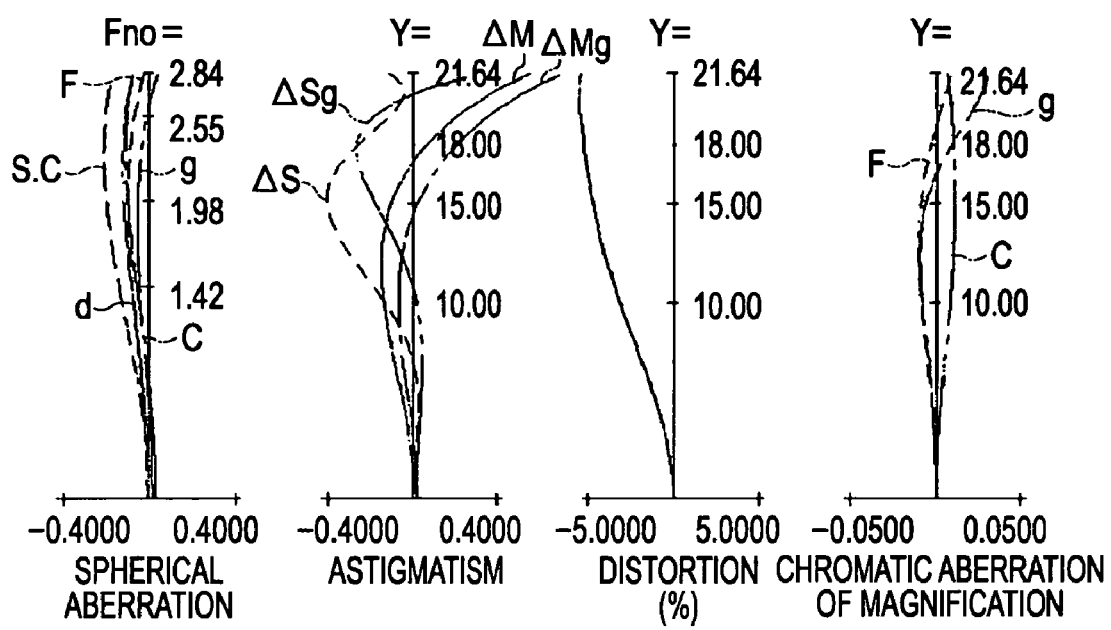
FIGS. 11A-C are aberration graphs of the optical system according to exemplary embodiment 5 when focusing on an object at infinity.
Figure 11B:
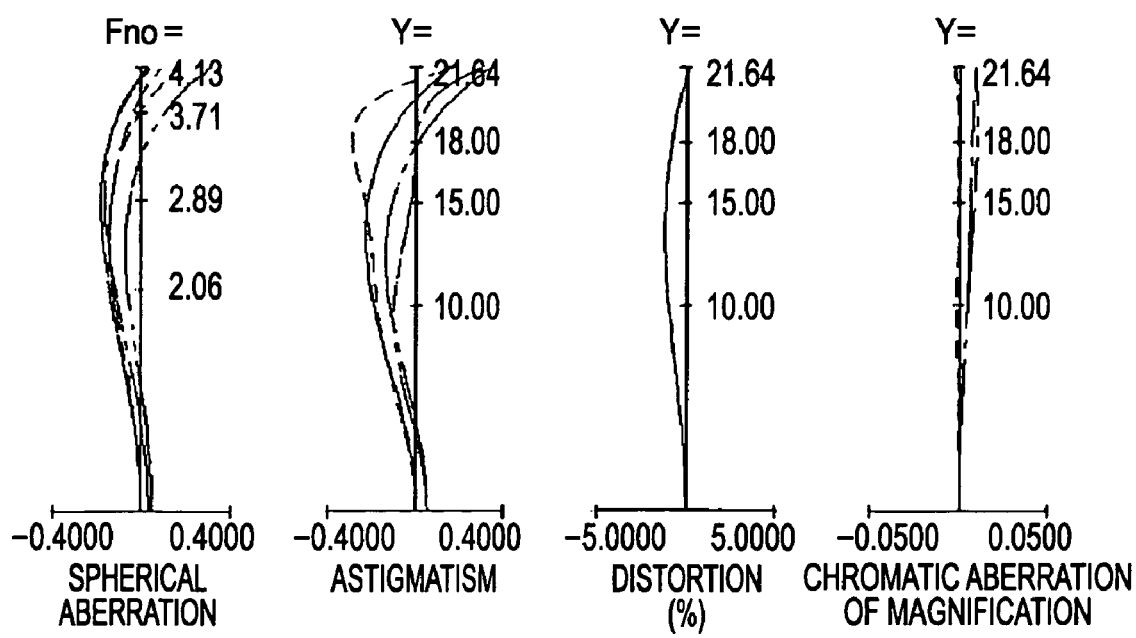
Figure 11C:
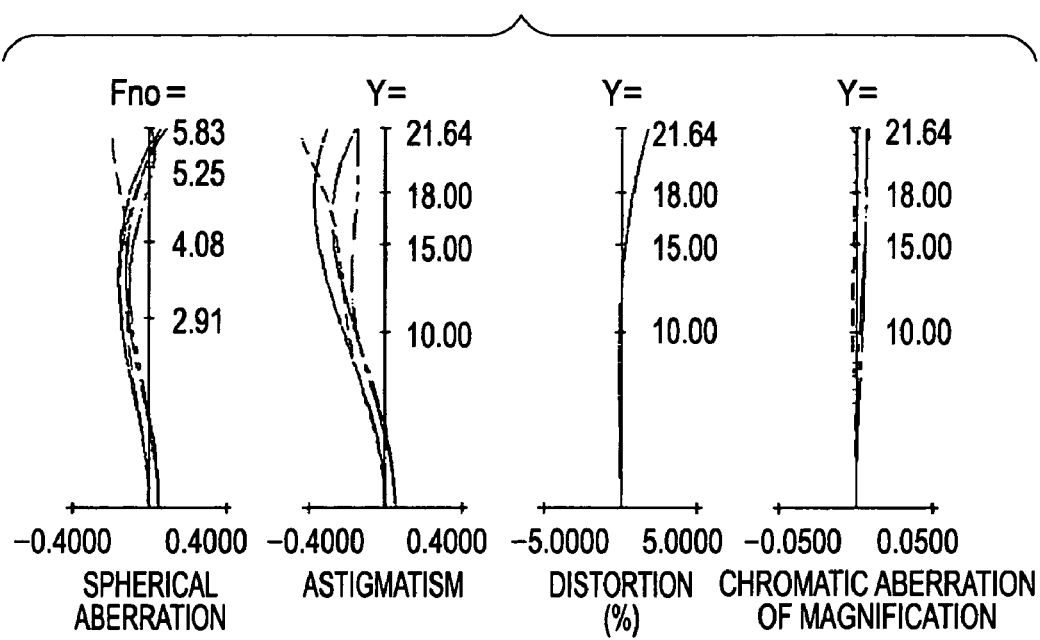

FIGS. 10A-C are sectional views of an optical system at a wide-angle end, at a middle zoom position, and at a telephoto end, respectively, according to exemplary embodiment 5. According to exemplary embodiment 5, a five-lens-unit zoom lens includes a first lens unit L1 which can have a negative refractive power, a second lens unit L2 which can have a negative refractive power, a third lens unit L3 which can have a positive refractive power, a fourth lens unit L4 which can have a negative refractive power, and a fifth lens unit L5 which can have a positive refractive power. This zoom lens includes a refractive optical element formed from a mixture (e.g., of $TiO_2$ particles dispersed in a UV curable resin). In FIGS. 10A-C, a lens (layer) formed from the mixture (e.g., of $TiO_2$ particles dispersed in a UV curable resin) is designated as GITd. An aperture stop is designated as SP. An image plane is designated as IP. FIGS. 11A-C are aberration graphs at a wide-angle end (W), at a middle zoom position (middle focal length: M), and at a telephoto end (T), of the optical system (zoom lens), respectively, according to exemplary embodiment 5 when focusing on an object at infinity.

In the optical system according to exemplary embodiment 5, a lens GITd is introduced in the first lens unit L1 which is the closest to the object among the lens units of the zoom lens and at which the passing position of a paraxial chief ray R is equivalently high from the optical axis La. At that time, the lens GITd has a shape so that a negative refractive power increases towards the periphery from the optical axis. Additionally, the surface of the lens GIT is aspherized. Consequently, the shape provides a positive refractive power around the optical axis and provides a stronger negative refractive power towards the periphery from the optical axis. Thus, axial chromatic aberration and chromatic aberration of magnification are corrected and/or reduced contemporaneously, and therefore, a high-performance optical system can be obtained.

Exemplary Embodiment 6

Figures 12A, 12B, 12C:
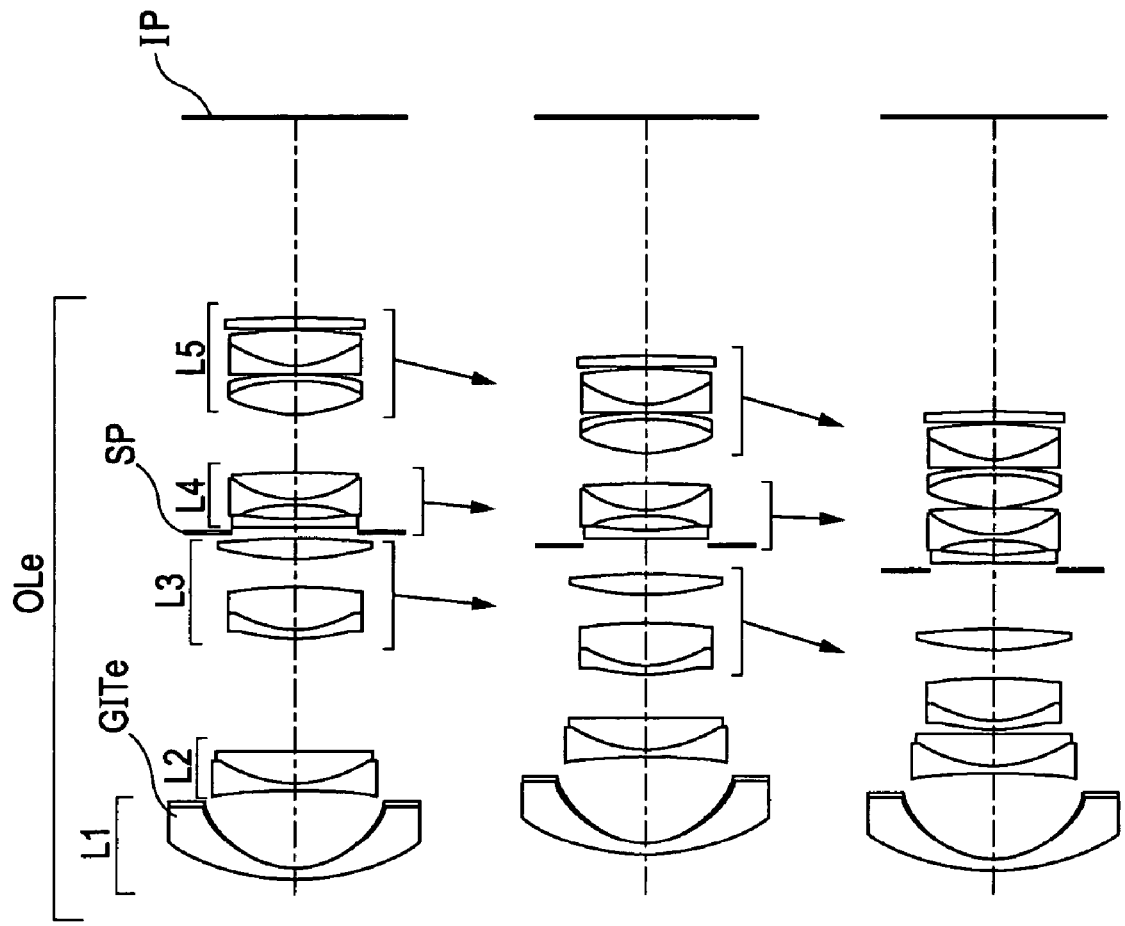
FIGS. 12A-C are sectional views of an optical system according to exemplary embodiment 6.

FIGS. 12A-C are sectional views of an optical system at a wide-angle end, at a middle zoom position, and at a telephoto end, respectively, according to exemplary embodiment 6. According to exemplary embodiment 6, a five-lens-unit zoom lens includes a first lens unit L1 which can have a negative refractive power, a second lens unit L2 which can have a negative refractive power, a third lens unit L3 which can have a positive refractive power, a fourth lens unit L4 which can have a negative refractive power, and a fifth lens unit L5 which can have a positive refractive power. This zoom lens includes a refractive optical element formed from a mixture (e.g., of $TiO_2$ particles dispersed in a UV curable resin). In FIGS. 12A-C, a lens (layer) formed from the mixture (e.g., of $TiO_2$ particles dispersed in a UV curable resin) is designated as GITe. An aperture stop is designated as SP. An image plane is designated as IP.

Figure 13A:
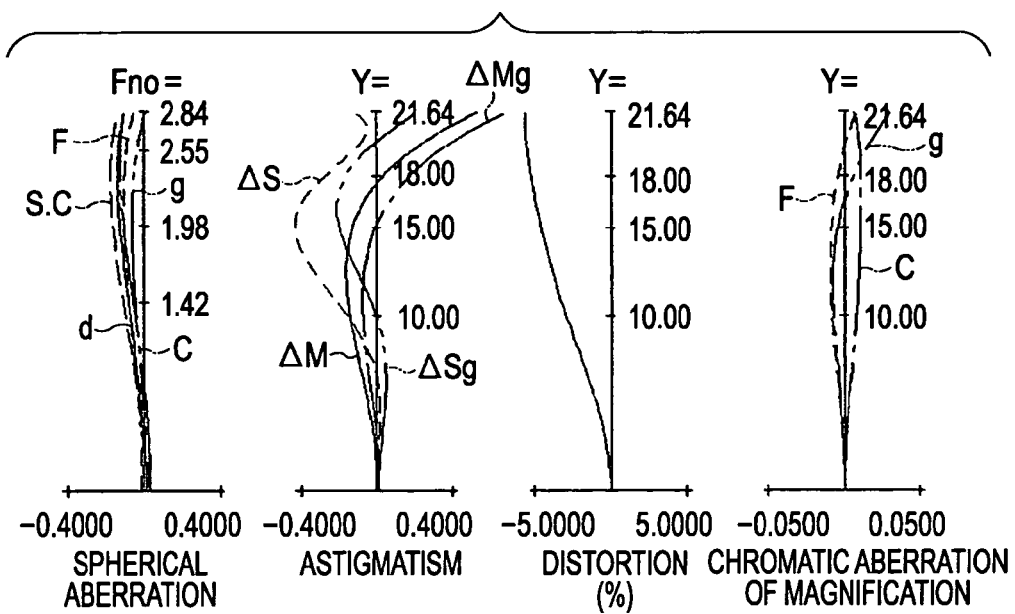
Figure 13B:
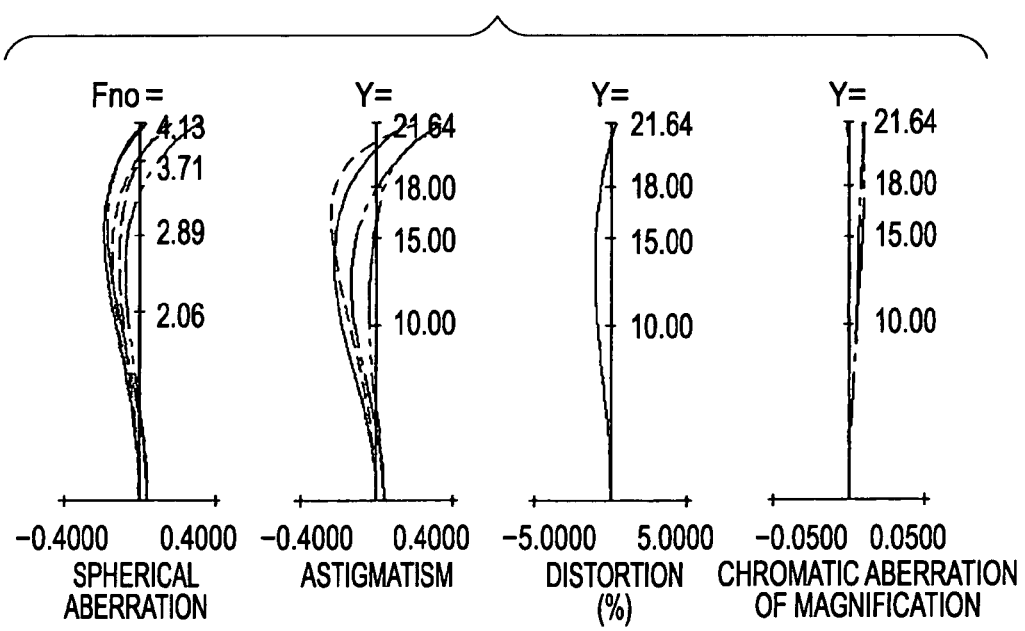

FIGS. 13A-C are aberration graphs at a wide-angle end (W), at a middle zoom position (middle focal length: M), and at a telephoto end (T), of the optical system (zoom lens), respectively, according to exemplary embodiment 6 when focusing on an object at infinity.

In the optical system according to exemplary embodiment 6, a lens GITe is introduced in the first lens unit L1 which is the closest to the object among the lens units of the zoom lens and at which the passing position of a paraxial chief ray R is equivalently high from the optical axis La. At that time, the lens GITe has a shape so that a negative refractive power increases towards the periphery from the optical axis. Thus, the negative refractive power is provided to the lens GITe so that chromatic aberration of magnification is primarily corrected and/or reduced. Thus, a high-performance optical system can be obtained.

Exemplary Embodiment 7

Figures 14A, 14B, 14C:
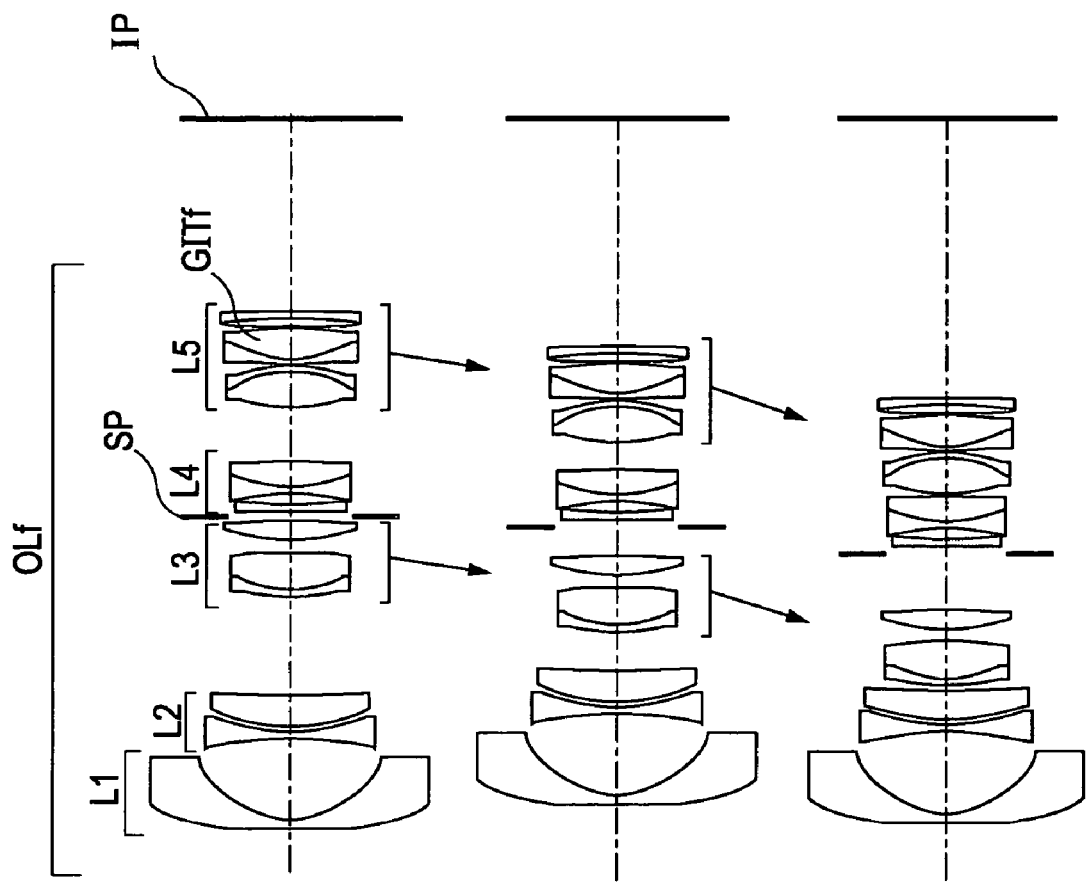
FIGS. 14A-C are sectional views of an optical system according to exemplary embodiment 7.
Figure 15A:
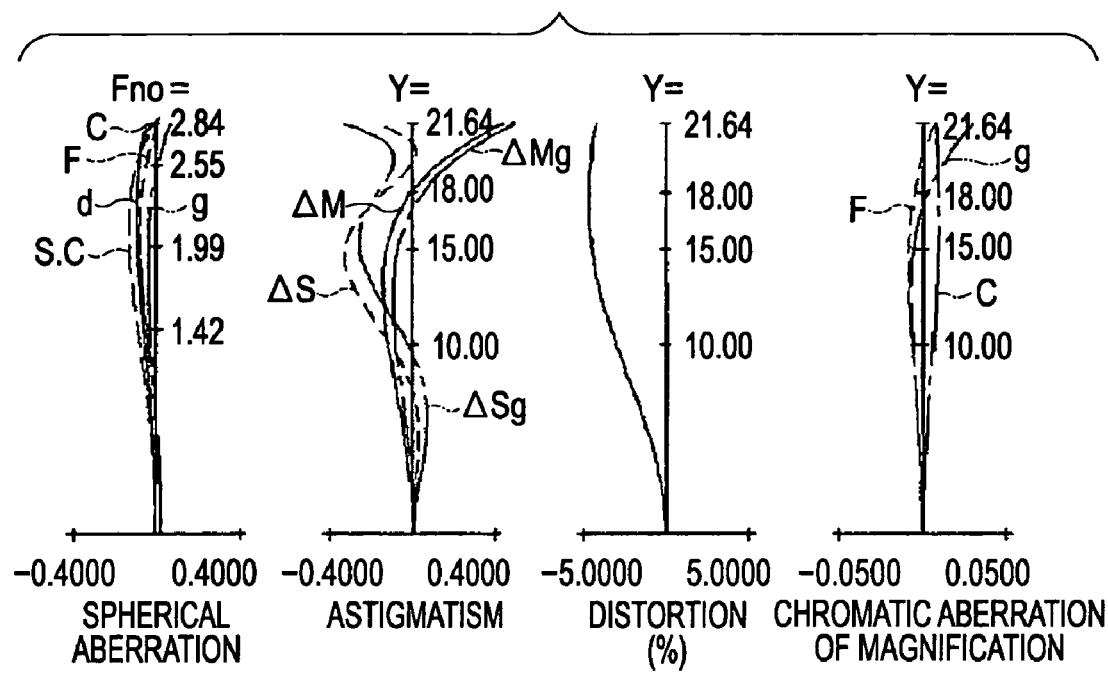
FIGS. 15A-C are aberration graphs of the optical system according to exemplary embodiment 7 when focusing on an object at infinity.
Figure 15B:
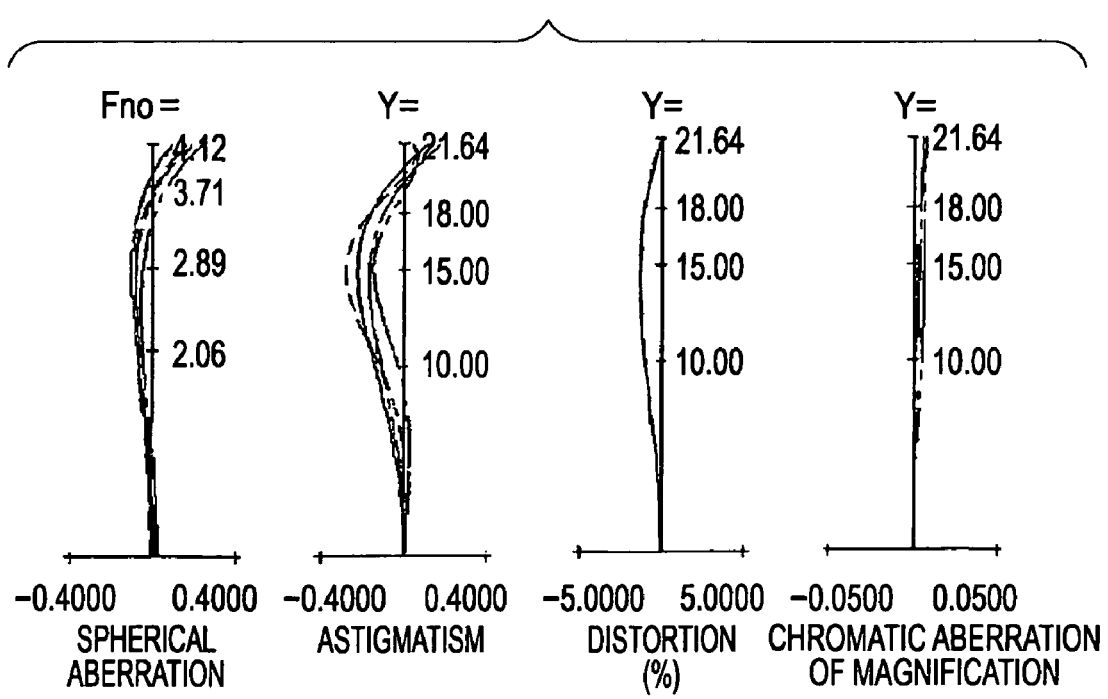
Figure 15C:
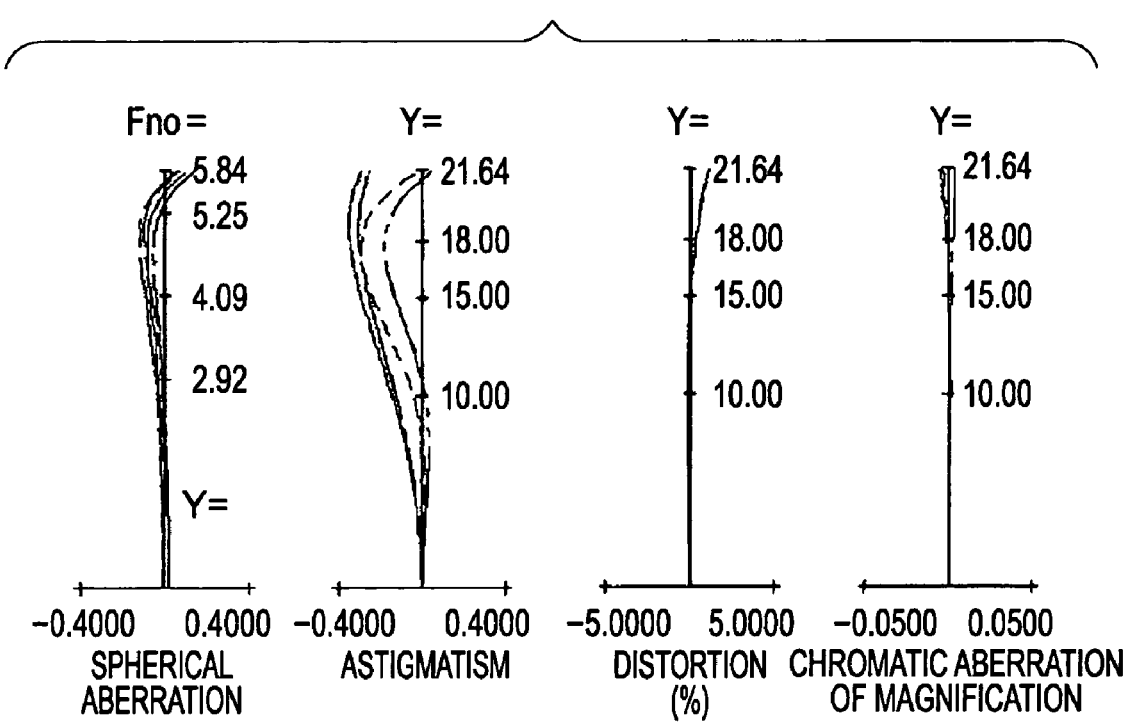

FIGS. 14A-C are sectional views of an optical system at a wide-angle end, at a middle zoom position, and at a telephoto end, respectively, according to exemplary embodiment 7. According to exemplary embodiment 7, a five-lens-unit zoom lens includes a first lens unit L1 which can have a negative refractive power, a second lens unit L2 which can have a negative refractive power, a third lens unit L3 which can have a positive refractive power, a fourth lens unit L4 which can have a negative refractive power, and a fifth lens unit L5 which can have a positive refractive power. This zoom lens includes a refractive optical element (e.g., formed from a UV curable resin). In FIGS. 14A-C, a lens (layer) (e.g., formed from a UV curable resin) is designated as GITf. An aperture stop is designated as SP. An image plane is designated as IP. FIGS. 15A-C are aberration graphs at a wide-angle end (W), at a middle zoom position (middle focal length: M), and at a telephoto end (T), of the optical system (zoom lens), respectively, according to exemplary embodiment 7 when focusing on an object at infinity.

In the optical system according to exemplary embodiment 7, a lens GITf is introduced in the rearmost fifth lens unit L5 at which the passing position of a paraxial chief ray R is equivalently high from the optical axis La. At that time, the lens GIT has a shape so that a positive refractive power increases towards the periphery from the optical axis. Thus, the positive refractive power is provided to the lens GITf so that axial chromatic aberration and chromatic aberration of magnification are corrected and/or reduced. Thus, a high-performance optical system can be obtained.

It should be noted that an optical system according to at least one exemplary embodiment is applicable to any type of retro focus optical systems (retro focus system at the wide-angle end when the optical system is a zoom lens).

Numeric data are now herein described in detail according to exemplary embodiments 1 to 7. In exemplary embodiments 1 to 7, i denotes the order numbered from the object. Ri denotes the radius of curvature of the i-th optical surface (the i-th surface), and Di denotes the distance between the i-th surface and the (i+1)th surface on the optical axis. Ni and vi denote the index of refraction and the Abbe number of a material of the i-th optical member (except for a lens (layer) formed from resin or a $TiO_2$ particle dispersion material) for d-line, respectively. The indices of refraction and the Abbe numbers of a lens GITj formed from a resin or a $TiO_2$ particle dispersion material for d-line are designated by NGITj and vGITj (j=1, 2, . . . ), respectively. f denotes the focal length. Fno denotes the F number. ω denotes the half viewing angle.

The aspheric surface x(h) is expressed by the following equation:

$$x(h) = \frac{(1/r)h^2}{1+\sqrt{\{1-(1+k)(h/r)^2\}}} + Bh^4 + Ch^6 + Dh^8 + Eh^{10} \cdots$$

where x=displacement from the surface vertex in the optical axis direction, h=height from the optical axis in a direction orthogonal to the optical axis, r=the paraxial radius of curvature, k=the conic constant, and B, C, D, E . . . =aspherical coefficients at respective orders.

It is noted that "E±XX" in each aspherical coefficient means "×$10^{\pm XX}$".

Additionally, Table 3 shows a relationship between the above-described conditional expressions and the values in the numeric embodiments.

In exemplary embodiments 4 and 7, a UV curable resin alone can be used for a material of the lens GITc,f. In numeric embodiments 1, 2, 3, 5, and 6, $TiO_2$ particles dispersed in a host polymer are used for a material of the lens GIT and GITa,b,d. The index of refraction of the $TiO_2$ particles dispersion material is determined by using the above-described equation (i). A UV curable resin is used as the host polymer. The volume fraction of $TiO_2$ is about 3%.

Table 1 illustrates the indices of refraction, the Abbe numbers, and the partial dispersion ratios of a UV curable resin and $TiO_2$ itself for d-line, g-line, C-line, and F line. Table 2 illustrates the indices of refraction, the Abbe numbers, and the partial dispersion ratios of a mixture in which $TiO_2$ particles are dispersed in a UV curable resin with a volume fraction of about 3% for d-line, g-line, C-line, and F line.

| Numeric Embodiment 1 | | | |
|---|---|---|---|
| f 14.39 mm | Fno 2.89 | 2ω 112.73° | |
| | R | D | Nd | vd |
| 1 | 43.917 | 3.10 | 1.86058 | 37.0 |
| 2 | 28.569 | 12.47 | | |
| 3 | 54.226 | 5.83 | 1.60311 | 60.7 |

| -continued | | | |
|---|---|---|---|
| Numeric Embodiment 1 | | | |
| (Aspherical Surface) | | | | |
| 4 | 66.772 | 0.15 | | |
| 5 | 32.072 | 1.70 | 1.78045 | 49.5 |
| 6 | 15.696 | 7.65 | | |
| 7 | 87.341 | 1.30 | 1.76000 | 51.8 |
| 8 | 18.871 | 7.02 | | |
| 9 | 128.406 | 1.50 | 1.75500 | 52.4 |
| 10 | 20.624 | 8.86 | 1.68747 | 32.0 |
| 11 | −48.028 | 2.74 | | |
| 12 | 60.740 | 9.58 | 1.58400 | 40.9 |
| 13 | −9.323 | 1.50 | 1.66310 | 57.6 |
| 14 | −14.032 | 0.55 | | |
| 15 | −14.845 | 0.90 | 1.86320 | 41.6 |
| 16 | −39.004 | 0.15 | | |
| 17 | Aperture | 0.94 | | |
| 18 | 89.341 | 9.97 | 1.62911 | 35.6 |
| 19 | −27.630 | 4.00 | 1.84825 | 25.3 |
| 20 | 57.031 | 0.75 | | |
| 21 | −326.487 | 0.80 | 1.92286 | 21.3 |
| 22 | 38.054 | 4.53 | 1.54297 | 65.8 |
| 23 | −18.360 | 0.15 | | |
| 24 | 109.719 | 2.01 | NGIT1 = 1.55324 | vGIT1 = 39.8 |
| 25 | −53.686 | 1.95 | 1.85650 | 42.1 |
| 26 | −35.056 | 40.86 | | |

| Aspherical Coefficient | | | | | |
|---|---|---|---|---|---|
| | k | B | C | D | E |
| 3 | 0 | 8.67E−06 | 4.05E 09 | 1.19E 11 | 1.92E 14 |

| Numeric Embodiment 2 | | | |
|---|---|---|---|
| f 14.39 mm | Fno 2.89 | 2ω 112.76° | |
| | R | D | Nd | vd |
| 1 | 45.009 | 3.10 | 1.86320 | 41.6 |
| 2 | 29.354 | 9.31 | | |
| 3 | 70.658 | 5.83 | 1.60311 | 60.7 |
| (Aspherical Surface) | | | | |
| 4 | 70.386 | 1.09 | | |
| 5 | 27.311 | 1.70 | 1.74518 | 52.9 |
| 6 | 15.965 | 7.73 | | |
| 7 | 174.616 | 1.30 | 1.86277 | 40.3 |
| 8 | 19.292 | 8.32 | | |
| 9 | 61.383 | 1.50 | 1.85104 | 41.3 |
| 10 | 16.884 | 7.15 | 1.74675 | 27.8 |
| 11 | −73.224 | 3.08 | | |
| 12 | 110.004 | 9.23 | 1.56014 | 46.1 |
| 13 | −8.849 | 1.50 | 1.62468 | 55.5 |
| 14 | −14.521 | 0.65 | | |
| 15 | −15.899 | 0.90 | 1.86432 | 41.5 |
| 16 | −32.675 | 0.30 | | |
| 17 | Aperture | 1.71 | | |
| 18 | 56.365 | 9.18 | 1.68557 | 31.1 |
| 19 | −46.007 | 4.00 | 1.84632 | 23.8 |
| 20 | 64.324 | 1.27 | | |
| 21 | −60.577 | 0.80 | 1.92286 | 21.3 |
| 22 | 53.393 | 4.74 | 1.49043 | 70.3 |
| 23 | −18.360 | 0.15 | | |
| 24 | 97.448 | 2.04 | NGIT1 −1.55324 | vGIT1 −39.8 |
| (Aspherical Surface) | | | | |
| 25 | −51.309 | 2.43 | 1.61179 | 60.9 |
| 26 | −28.429 | 40.86 | | |

-continued

Numeric Embodiment 2

Aspherical Coefficient

| | k | B | C | D | E |
|---|---|---|---|---|---|
| 3 | 0 | 9.22E 06 | 1.19E 10 | 5.38E 12 | 9.53E 15 |
| 24 | 0 | −1.10E−05 | 2.11E−08 | −7.97E−11 | 2.37E−14 |

Numeric Embodiment 3

| | R | D | Nd | νd |
|---|---|---|---|---|
| 1 | 44.000 | 3.10 | 1.49987 | 69.4 |
| 2 | 30.687 | 7.51 | | |
| 3 (Aspherical Surface) | 72.937 | 6.52 | 1.67868 | 56.1 |
| 4 | 73.668 | 0.05 | NGIT1 1.63555 | νGIT1 22.7 |
| 5 | 51.064 | 0.15 | | |
| 6 | 31.216 | 1.70 | 1.76011 | 52.2 |
| 7 | 15.317 | 9.26 | | |
| 8 | 129.880 | 1.30 | 1.86507 | 41.7 |
| 9 | 18.889 | 8.53 | | |
| 10 | 33.698 | 1.50 | 1.81470 | 46.2 |
| 11 | 12.304 | 8.57 | 1.68309 | 31.0 |
| 12 | −62.166 | 2.33 | | |
| 13 | 256.563 | 7.42 | 1.56997 | 41.6 |
| 14 | −9.312 | 1.50 | 1.75281 | 52.7 |
| 15 | −13.235 | 0.43 | | |
| 16 | −15.549 | 0.90 | 1.86514 | 41.6 |
| 17 | −30.707 | 0.50 | | |
| 18 | Aperture | 1.51 | | |
| 19 | 78.038 | 9.44 | 1.62258 | 36.1 |
| 20 | −21.201 | 4.00 | 1.84931 | 23.8 |
| 21 | 70.790 | 0.66 | | |
| 22 | −398.392 | 0.80 | 1.92286 | 21.3 |
| 23 | 36.706 | 5.93 | 1.48660 | 70.5 |
| 24 | −17.172 | 0.15 | | |
| 25 | 137.419 | 3.16 | 1.83667 | 32.3 |
| 26 | −54.095 | 41.92 | | |

Aspherical Coefficient

| | k | B | C | D | E |
|---|---|---|---|---|---|
| 3 | 0 | 8.69E 06 | 2.64E 09 | 1.12E 13 | 3.83E 15 |

Numeric Embodiment 4 f 14.46 mm    Fno 2.89    2ω 112.49°

| | R | D | Nd | νd |
|---|---|---|---|---|
| 1 | 45.547 | 3.10 | 1.86410 | 40.5 |
| 2 | 28.810 | 8.76 | | |
| 3 (Aspherical Surface) | 53.582 | 5.50 | 1.60311 | 60.7 |
| 4 | 55.004 | 0.75 | | |
| 5 | 32.735 | 1.70 | 1.78124 | 49.5 |
| 6 | 17.127 | 5.72 | | |
| 7 | 27.595 | 1.30 | 1.77820 | 49.9 |
| 8 | 15.200 | 7.24 | | |
| 9 | −72.894 | 1.50 | 1.73636 | 53.7 |
| 10 | 22.235 | 8.73 | 1.67568 | 31.5 |
| 11 | −36.125 | 5.19 | | |
| 12 | 48.391 | 9.27 | 1.55927 | 48.7 |
| 13 | −8.735 | 1.50 | 1.75567 | 52.4 |

-continued

Numeric Embodiment 4

| | | | | |
|---|---|---|---|---|
| 14 | −12.518 | 0.49 | | |
| 15 | −15.262 | 0.90 | 1.74295 | 49.6 |
| 16 | −68.918 | 0.40 | | |
| 17 | Aperture | 0.48 | | |
| 18 | 51.138 | 10.56 | 1.61411 | 60.7 |
| 19 | −16.859 | 4.00 | 1.81175 | 40.3 |
| 20 | 122.380 | 0.93 | | |
| 21 | −59.450 | 0.80 | 1.92286 | 21.3 |
| 22 | 28.737 | 1.85 | | |
| 23 | −549.447 | 3.91 | 1.65122 | 58.3 |
| 24 | −19.614 | 0.15 | NGIT1 = 1.63555 | νGIT1 = 22.7 |
| 25 | 116.347 | 3.98 | 1.70475 | 55.8 |
| 26 | −39.496 | 0.00 | | |

Aspherical Coefficient

| | k | B | C | D | E |
|---|---|---|---|---|---|
| 3 | 0 | 9.43E−06 | 1.23E−09 | −7.20E−12 | 1.67E−14 |

Numeric Embodiment 5 f 16.50~24.01~33.92 mm    Fno 2.91    2ω 105.33~84.04~65.06°

| | R | D | Nd | νd |
|---|---|---|---|---|
| 1 (Aspherical Surface) | 66.898 | 2.00 | 1.85261 | 27.1 |
| 2 | 18.772 | 0.05 | NGIT1 1.55324 | νGIT1 39.8 |
| 3 (Aspherical Surface) | 19.717 | (Variable) | | |
| 4 | 91.686 | 1.20 | 1.84133 | 42.7 |
| 5 | 27.935 | 0.05 | 1.51640 | 52.2 |
| 6 (Aspherical Surface) | 23.388 | 0.18 | | |
| 7 | 26.695 | 6.07 | 1.75615 | 27.6 |
| 8 | 1570.290 | (Variable) | | |
| 9 | 64.761 | 1.30 | 1.84777 | 23.7 |
| 10 | 20.962 | 8.57 | 1.63329 | 61.0 |
| 11 | 76.137 | 5.47 | | |
| 12 | 50.211 | 4.24 | 1.85111 | 24.5 |
| 13 | −76.185 | (Variable) | | |
| 14 | Aperture | 1.56 | | |
| 15 | −193.435 | 1.45 | 1.85251 | 26.6 |
| 16 | 66.615 | 2.88 | | |
| 17 | −35.027 | 1.05 | 1.71247 | 55.1 |
| 18 | 22.432 | 5.01 | 1.85264 | 23.7 |
| 19 | −95.511 | (Variable) | | |
| 20 | 26.272 | 6.88 | 1.49700 | 81.5 |
| 21 | −25.487 | 1.20 | 1.85058 | 25.3 |
| 22 | 41.577 | 0.15 | | |
| 23 | −408.382 | 1.20 | 1.85112 | 23.6 |
| 24 | 18.890 | 7.03 | 1.49700 | 81.5 |
| 25 | −56.362 | 0.15 | | |
| 26 | 334.784 | 2.30 | 1.85890 | 34.8 |
| 27 (Aspherical Surface) | −231.238 | | | |

Aspherical Coefficient

| | k | B | C | D | E |
|---|---|---|---|---|---|
| 1 | 0 | 2.03E−05 | −5.74E−08 | 1.29E−10 | −1.54E−13 |
| 3 | 0 | 3.13E−05 | −4.85E−08 | 1.55E−10 | −5.45E−13 |
| 6 | 0 | −1.34E−05 | −1.06E−08 | 7.78E−11 | −8.35E−13 |
| 27 | 0 | 6.49E 06 | 3.13E 08 | 3.11E 10 | 2.10E−12 |

Numeric Embodiment 5

Variable Distance

| f | 16.50 | 24.01 | 33.92 |
|---|---|---|---|
| D3 | 15.43 | 17.13 | 17.13 |
| D8 | 22.32 | 8.57 | 1.15 |
| D13 | 0.59 | 5.72 | 11.14 |
| D19 | 11.51 | 5.77 | 0.35 |

Numeric Embodiment 6 f 16.50~24.01~33.92 mm   Fno 2.91   2ω 105.33~84.04~65.06°

| | R | D | Nd | νd |
|---|---|---|---|---|
| 1 (Aspherical Surface) | 67.614 | 2.00 | 1.85200 | 25.8 |
| 2 | 19.750 | 0.05 | NGIT1 1.55324 | νGIT1 39.8 |
| 3 (Aspherical Surface) | 19.717 | (Variable) | | |
| 4 | 95.826 | 1.20 | 1.85278 | 42.7 |
| 5 | 27.426 | 0.05 | 1.51640 | 52.2 |
| 6 (Aspherical Surface) | 23.586 | 0.18 | | |
| 7 | 26.591 | 5.86 | 1.75697 | 27.0 |
| 8 | 1517.264 | (Variable) | | |
| 9 | 64.637 | 1.30 | 1.84837 | 23.8 |
| 10 | 20.901 | 8.81 | 1.63259 | 59.8 |
| 11 | −80.184 | 4.94 | | |
| 12 | 48.409 | 4.14 | 1.85112 | 24.3 |
| 13 | −81.040 | (Variable) | | |
| 14 | Aperture | 1.56 | | |
| 15 | 198.783 | 1.45 | 1.85256 | 26.9 |
| 16 | 63.970 | 2.98 | | |
| 17 | 35.097 | 1.05 | 1.69989 | 55.7 |
| 18 | 22.561 | 4.96 | 1.85157 | 23.7 |
| 19 | −97.851 | (Variable) | | |
| 20 | 26.661 | 6.80 | 1.49700 | 81.5 |
| 21 | −25.584 | 1.20 | 1.84627 | 23.8 |
| 22 | 42.738 | 0.15 | | |
| 23 | −540.283 | 1.20 | 1.84808 | 23.7 |
| 24 | 19.205 | 7.10 | 1.49700 | 81.5 |
| 25 | 56.458 | 0.15 | | |
| 26 | 819.964 | 2.30 | 1.85915 | 35.0 |
| 27 (Aspherical Surface) | 156.159 | | | |

Aspherical Coefficient

| | k | B | C | D | E |
|---|---|---|---|---|---|
| 1 | 0 | 1.50E−05 | −3.33E−08 | 6.36E 11 | −6.76E−14 |
| 3 | 0 | 1.99E−05 | −1.80E−08 | 7.85E−12 | 5.40E−15 |
| 6 | 0 | −1.27E−05 | 9.65E 09 | −1.71E 10 | 5.57E 13 |
| 27 | 0 | 6.99E−06 | 1.93E−08 | −1.51E−10 | 1.15E−12 |

Variable Distance

| f | 16.50 | 24.01 | 33.92 |
|---|---|---|---|
| D3 | 15.19 | 17.13 | 17.13 |
| D8 | 22.45 | 8.57 | 1.15 |
| D13 | 0.49 | 5.72 | 11.14 |
| D19 | 11.58 | 5.77 | 0.35 |

Numeric Embodiment 7 f 16.51~33.98 mm   Fno 2.91   2ω 105.31~64.97°

| | R | D | Nd | νd |
|---|---|---|---|---|
| 1 (Aspherical Surface) | 491.437 | 2.00 | 1.53611 | 66.2 |
| 2 | 20.085 | (Variable) | | |
| 3 (Aspherical Surface) | 69.790 | 1.20 | 1.86021 | 41.8 |
| 4 | 45.442 | 0.05 | 1.51640 | 52.2 |
| 5 | 49.858 | 0.77 | | |
| 6 (Aspherical Surface) | 40.321 | 6.41 | 1.81339 | 24.9 |
| 7 | 231.980 | (Variable) | | |
| 8 | 58.297 | 1.30 | 1.84113 | 28.2 |
| 9 | 23.912 | 7.89 | 1.56582 | 54.0 |
| 10 | 71.007 | 2.39 | | |
| 11 | 39.724 | 4.17 | 1.71667 | 47.2 |
| 12 | 118.595 | (Variable) | | |
| 13 | Aperture | 1.56 | | |
| 14 | −1963.513 | 1.45 | 1.86147 | 38.8 |
| 15 | 63.865 | 2.70 | | |
| 16 | −32.990 | 1.05 | 1.69134 | 45.0 |
| 17 | 27.389 | 5.38 | 1.84714 | 24.5 |
| 18 | −114.014 | (Variable) | | |
| 19 | 38.555 | 7.41 | 1.51893 | 66.2 |
| 20 | −22.538 | 1.20 | 1.84495 | 24.1 |
| 21 | −36.826 | 0.15 | | |
| 22 | 154.383 | 1.20 | 1.84842 | 24.9 |
| 23 | 24.726 | 6.41 | 1.49700 | 81.5 |
| 24 | −82.251 | 0.15 | | |
| 25 | 257.777 | 2.06 | NGIT1 = 1.63555 | νGIT1 = 22.7 |
| 26 | −71.273 | 1.05 | 1.78503 | 48.8 |
| 27 (Aspherical Surface) | −168.879 | | | |

Aspherical Coefficient

| | k | B | C | D | E |
|---|---|---|---|---|---|
| 1 | 0 | 1.71E 05 | 2.42E 08 | 3.24E−11 | 2.53E 14 |
| 3 | 0 | 1.02E−05 | −1.12E−08 | −8.67E−11 | 4.95E−13 |
| 6 | 0 | 6.78E−06 | 1.99E−09 | 4.14E−11 | 3.00E−13 |
| 27 | 0 | 1.30E 05 | 8.33E 09 | 4.82E 11 | 3.58E 13 |

Variable Distance

| | 16.50 | 24.01 | 33.92 |
|---|---|---|---|
| D2 | 17.03 | 17.13 | 17.13 |
| D7 | 20.96 | 8.57 | 1.15 |
| D12 | 0.18 | 5.72 | 11.14 |
| D18 | 11.11 | 5.77 | 0.35 |

TABLE 1

| | UV Curable Resin | TiO$_2$ |
|---|---|---|
| d-line Refraction Index | 1.63555 | 2.30377 |
| g-line Refraction Index | 1.67532 | 2.45676 |
| C-line Refraction Index | 1.62807 | 2.28032 |
| F-line Refraction Index | 1.65604 | 2.37452 |
| ν d | 22.7 | 13.8 |
| θ g d | 1.422 | 1.624 |
| θ gF | 0.689 | 0.873 |

TABLE 2

| | TiO$_2$ 3%-UV Curable Resin 2 |
|---|---|
| d-line Refraction Index | 1.55324 |
| g-line Refraction Index | 1.57249 |
| C-line Refraction Index | 1.54936 |
| F-line Refraction Index | 1.56326 |
| ν d | 39.8 |
| θ g d | 1.385 |
| θ gF | 0.665 |

TABLE 3

| Conditional Expressions | Numeric Embodiments | | | | | | |
|---|---|---|---|---|---|---|---|
| | 1 | 2 | 3 | 4 | 5 | 6 | 7 |
| <1> | 0.609 | 0.609 | 0.645 | 0.645 | 0.609 | 0.609 | 0.645 |
| <2> | 0.665 | 0.665 | 0.689 | 0.689 | 0.665 | 0.665 | 0.689 |
| <3> | 1.324 | 1.324 | 1.365 | 1.365 | 1.324 | 1.324 | 1.365 |
| <4> | 1.385 | 1.385 | 1.422 | 1.422 | 1.385 | 1.385 | 1.422 |
| <5> | 38.9 | 38.9 | 22.7 | 22.7 | 38.9 | 38.9 | 22.7 |
| <6> | — | — | 0.0555 | — | 0.0245 | 0.0005 | — |
| <7> | 0.220 | 0.236 | — | 0.0085 | — | — | 0.187 |
| <8> | $-1.358 \times 10^4$ | $-1.358 \times 10^4$ | $-1.7055 \times 10^4$ | $-1.7055 \times 10^4$ | $-1.358 \times 10^4$ | $-1.358 \times 10^4$ | $-1.7055 \times 10^4$ |
| <9> | 8.97 | 9.90 | 8.51 | 8.83 | 8.99 | 8.96 | 8.91 |

Figure 16:
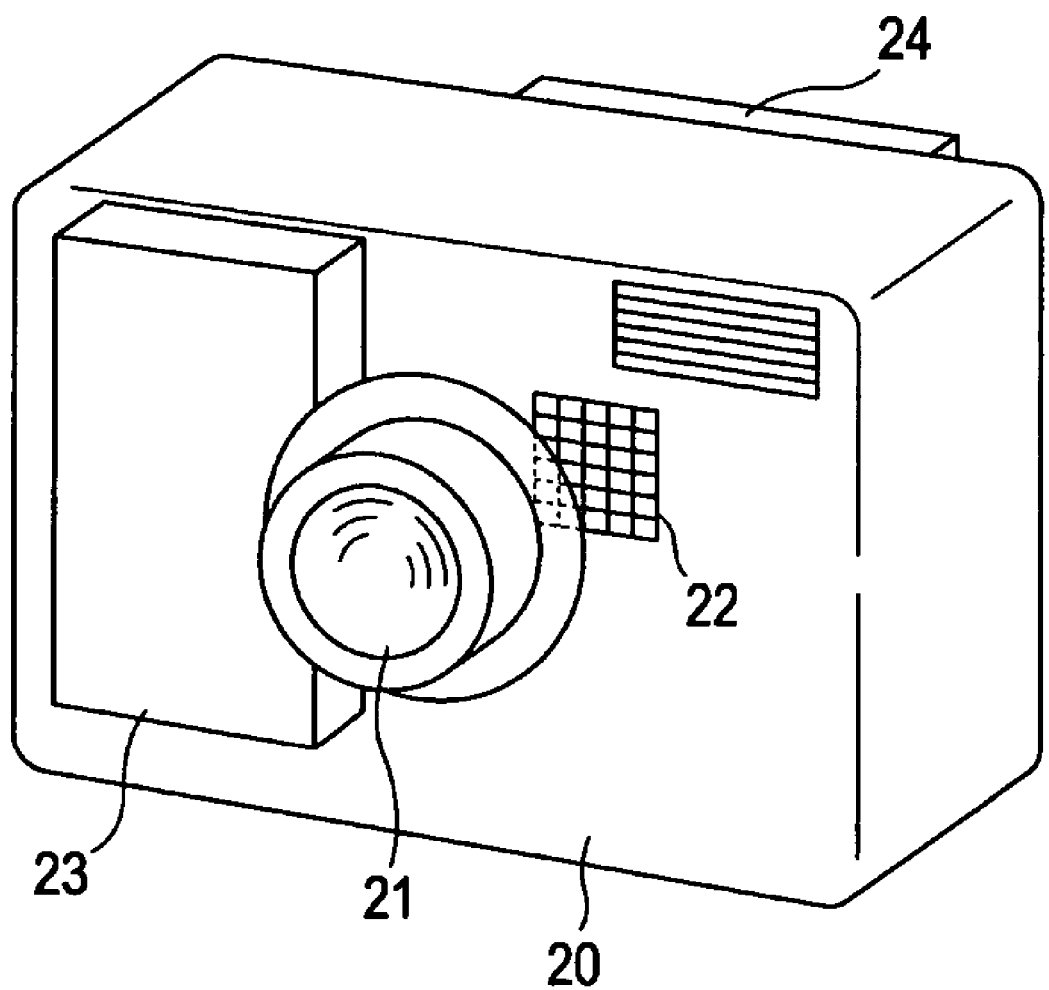
FIG. 16 is a schematic diagram of a main portion of an image capturing system according to an exemplary embodiment of the present invention.

A digital still camera (image pickup apparatus) is now herein described that includes an optical system according to at least one exemplary embodiment as a photographic optical system with reference to FIG. 16.

As illustrated in FIG. 16, a camera body 20 of a digital camera includes a photographic optical system 21 configured with the optical system according to at least one exemplary embodiment, a solid-state image pickup device (photoelectric transducer) (e.g., CCD sensor or CMOS sensor) 22 for receiving a subject image, a memory 23 for storing information corresponding to the subject image photoelectrically converted by the solid-state image pickup device 22, and a finder 24 including display panel (e.g., a liquid crystal) for visualizing the subject image formed on the solid-state image pickup device 22.

As described above, by applying an optical system according to at least one exemplary embodiment to a photographing optical system of, for example, a digital camera, a compact image pickup apparatus having high-performance can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-125149 filed Apr. 22, 2005, which is hereby incorporated by reference herein in its entirety.

What is claimed is:

1. An optical system comprising:

a refractive optical element composed of a solid material, the Abbe number νd and the partial dispersion ratio θgF of the solid material satisfying the following conditions:

$-2.100 \times 10^{-3} \cdot \nu d + 0.693 < \theta gF$, and $0.555 < \theta gF < 0.9$;

wherein a height of a paraxial marginal ray passing through a forefront lens surface of the optical system is less than, as measured from an optical axis, a maximum height of the paraxial marginal ray passing through a lens surface positioned at the rear of an intersection point of the optical axis with a paraxial chief ray, and wherein the refractive optical element is disposed at the front of the intersection point and has a shape so that the thickness of the refractive optical element at a position of about 70% of the maximum effective ray diameter is greater than a thickness of the refractive optical element on the optical axis.

2. An optical system comprising:

a refractive optical element composed of a solid material, the Abbe number νd and the partial dispersion ratio θgF of the solid material satisfying the following conditions:

$-2.100 \times 10^{-3} \cdot \nu d + 0.693 < \theta gF$, and $0.555 < \theta gF < 0.9$;

wherein a height of a paraxial marginal ray passing through a forefront lens surface of the optical system is less than, as measured from an optical axis, a maximum height of the paraxial marginal ray passing through a lens surface positioned at the rear of an intersection point of the optical axis with a paraxial chief ray, and wherein the refractive optical element is disposed at the rear of the intersection point and has a shape so that the thickness of the refractive optical element at a position of about 70% of the maximum effective ray diameter is less than a thickness of the refractive optical element on the optical axis.

3. An optical system comprising:

an aperture stop; and a refractive optical element composed of a solid material, the Abbe number νd and the partial dispersion ratio θgF of the solid material satisfying the following conditions:

$-2.100 \times 10^{-3} \cdot \nu d + 0.693 < \theta gF$, and $0.555 < \theta gF < 0.9$;

wherein the optical system satisfies the following condition:

$2 < OTL/f < 15$, where OTL represents the total optical length of the optical system and f represents the focal length of the optical system, and wherein the refractive optical element is disposed at the front of the aperture stop and has a shape so that the thickness of the refractive optical element at a position of about 70% of the maximum effective ray diameter is greater than a thickness of the refractive optical element on the optical axis.

4. An optical system comprising:
an aperture stop; and
a refractive optical element composed of a solid material, the Abbe number νd and the partial dispersion ratio θgF of the solid material satisfying the following conditions:

$-2.100 \times 10^{-3} \cdot \nu d + 0.693 < \theta gF$, and $0.555 < \theta gF < 0.9$;

wherein the optical system satisfies the following condition:

$2 < OTL/f < 15$, where OTL represents the total optical length of the optical system and f represents the focal length of the optical system, and wherein the refractive optical element is disposed at the rear of the aperture stop and has a shape so that the thickness of the refractive optical element at a position of about 70% of the maximum effective ray diameter is less than a thickness of the refractive optical element on the optical axis.

5. The optical system according to claim 3, wherein a refractive power ΦGIT1 of the refractive optical element and a refractive power Φ of the entire optical system satisfy the following condition:

$0 < |\phi GIT1/\phi| < 0.5$.

6. The optical system according to claim 3, wherein a partial dispersion ratio θgd of the solid material satisfies the following condition:

$-2.407 \times 10^{-3} \cdot \nu d + 1.420 < \theta gd$, and $1.255 < \theta gd < 1.67$.

7. The optical system according to claim 3, wherein the Abbe number νd of the solid material satisfies the following condition:

$\nu d < 60$.

8. The optical system according to claim 3, wherein the optical system forms an image on a photoelectric transducer.

9. The optical system according to claim 4, wherein a refractive power φGIT2 of the refractive optical element and a refractive power φ of the entire optical system satisfy the following condition:

$0 < |\Phi GIT2/\Phi| < 1.0$.

10. The optical system according to claim 4, wherein a partial dispersion ratio θgd of the solid material satisfies the following condition:

$-2.407 \times 10^{-3} \cdot \nu d + 1.420 < \theta gd$, and $1.255 < \theta gd < 1.67$.

11. The optical system according to claim 4, wherein the Abbe number νd of the solid material satisfies the following condition:

$\nu d < 60$.

12. The optical system according to claim 4, wherein the optical system forms an image on a photoelectric transducer.

* * * * *